US012673851B2

(12) United States Patent
Ingram-Tedd et al.

(10) Patent No.: US 12,673,851 B2
(45) Date of Patent: Jul. 7, 2026

(54) GRID FRAMEWORK STRUCTURE

(71) Applicant: Ocado Innovation Limited, Hatfield (GB)

(72) Inventors: Andrew Ingram-Tedd, Hatfield (GB); Stephen Millward, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 582 days.

(21) Appl. No.: 18/043,963

(22) PCT Filed: Aug. 25, 2021

(86) PCT No.: PCT/EP2021/073546
§ 371 (c)(1),
(2) Date: Mar. 3, 2023

(87) PCT Pub. No.: WO2022/048973
PCT Pub. Date: Mar. 10, 2022

(65) Prior Publication Data
US 2023/0312309 A1      Oct. 5, 2023

(30) Foreign Application Priority Data

Sep. 4, 2020      (GB) ..................................... 2013968

(51) Int. Cl.
*B66C 7/08*          (2006.01)
*B65G 1/04*          (2006.01)
(52) U.S. Cl.
CPC .............. *B66C 7/08* (2013.01); *B65G 1/0464* (2013.01); *B65G 2207/30* (2013.01)

(58) Field of Classification Search
CPC ...... B66C 7/08; B65G 1/0464; B65G 2207/30
See application file for complete search history.

(56) References Cited

U.S. PATENT DOCUMENTS

| | | | |
|---|---|---|---|
| 5,421,129 A | 6/1995 | Sakamoto et al. | |
| 12,286,296 B2 * | 4/2025 | Kobayashi | ........... B65G 1/0464 |

(Continued)

FOREIGN PATENT DOCUMENTS

| | | |
|---|---|---|
| CA | 2102585 A1 | 5/1995 |
| CN | 209352463 U | 9/2019 |

(Continued)

OTHER PUBLICATIONS

International Search Report (PCT/ISA/210) and Written Opinion (PCT/ISA/237) mailed on Nov. 15, 2021, by the European Patent Office as the International Searching Authority for International Application No. PCT/EP2021/073546. 17 pages.

(Continued)

*Primary Examiner* — Saul Rodriguez
*Assistant Examiner* — Ashley K Romano
(74) *Attorney, Agent, or Firm* — Gregory Matt McCloskey

(57) ABSTRACT

A grid framework structure configured to support one or more load handling devices thereupon includes i) a grid structure including a plurality of grid cells; and ii) a load bearing framework, wherein the grid structure is suspended from the load bearing framework by three or more tension elements connected to a respective number of suspension points on the grid structure, each of the three or more tension elements having a length configured to suspend the grid structure in a substantially horizontal plane.

23 Claims, 19 Drawing Sheets

(56) References Cited

U.S. PATENT DOCUMENTS

| | | | | |
|---|---|---|---|---|
| 2019/0308812 A1* | 10/2019 | Lindblom | ............ | B65G 1/1375 |
| 2023/0122567 A1* | 4/2023 | Parks | ................... | B65G 1/0478 |
| | | | | 414/281 |
| 2023/0128175 A1* | 4/2023 | Phaneuf | ............... | B65G 1/0478 |
| | | | | 700/218 |
| 2023/0265672 A1* | 8/2023 | Bohan | ...................... | B65G 1/02 |
| | | | | 52/167.7 |
| 2023/0303326 A1* | 9/2023 | Cogley | .................. | B65G 1/065 |
| 2023/0312309 A1* | 10/2023 | Ingram-Tedd | ........ | E04H 9/0215 |
| | | | | 211/189 |
| 2023/0339679 A1* | 10/2023 | Bates | ................... | B65G 1/0464 |
| 2024/0317493 A1* | 9/2024 | Parks | ...................... | B65G 1/065 |

FOREIGN PATENT DOCUMENTS

| | | | |
|---|---|---|---|
| DE | 69303039 | T2 | 7/1996 |
| DE | 102017222801 | A1 | 6/2019 |
| EP | 0554057 | A1 | 8/1993 |
| EP | 0656312 | A1 | 6/1995 |
| JP | S4425958 | Y1 | 10/1969 |
| JP | H05202637 | A | 8/1993 |
| JP | H07208541 | A | 8/1995 |
| JP | 2546465 | B2 | 10/1996 |
| JP | 2013040494 | A | 2/2013 |
| JP | 2014218346 | A | 11/2014 |
| KR | 1020170138396 | A | 12/2017 |
| TW | 273003 | B | 3/1996 |
| WO | 2015019055 | A1 | 2/2015 |
| WO | 2015185628 | A2 | 12/2015 |
| WO | 2016166294 | A1 | 10/2016 |
| WO | 2017122150 | A1 | 7/2017 |
| WO | 2019101367 | A1 | 5/2019 |
| WO | 2019238702 | A1 | 12/2019 |

OTHER PUBLICATIONS

Search Report mailed on May 20, 2021, by the United Kingdom Patent Office for Application No. GB2013968.9, 4 pages.

Office Action (Examination Report No. 1) issued on Feb. 7, 2024, by the Australian Patent Office in corresponding Australian Patent Application No. 2021335275. (4 pages).

First Office Action issued on Mar. 5, 2024, by the Japanese Patent Office in corresponding Japanese Patent Application No. 2023-514986, and an English Translation of the Office Action. (9 pages).

Office Action issued on Aug. 21, 2024, by the Canadian Patent Office in corresponding Canadian Patent Application No. 3,193,138. (4 pages).

Office Action issued on Jan. 10, 2025 by the Australian Patent Office in corresponding Australian Application No. 2021335275 (3 pages) corresponding to Applicant's U.S. Appl. No. 18/043,963.

Office Action issued on Apr. 2, 2025 by the Korean Patent Office in corresponding Korean Application No. 10-2023-7010461(10 pages) corresponding to Applicant's U.S. Appl. No. 18/043,963.

* cited by examiner

30

32

34

36

38

39

10

GRID FRAMEWORK STRUCTURE

FIELD OF INVENTION

The present invention relates to the field of remotely operated load handling devices on tracks located on a grid framework structure for handling storage containers or bins stacked in the grid framework structure, more specifically to a grid framework structure for supporting the remotely operated load handling devices.

BACKGROUND

Storage systems 1 comprising a three-dimensional storage grid framework structure, within which storage containers/bins are stacked on top of each other, are well known. PCT Publication No. WO2015/185628A (Ocado) describes a known storage and fulfilment or distribution system in which stacks of bins or containers are arranged within a grid framework structure. The bins or containers are accessed by load handling devices remotely operative on tracks located on the top of the grid framework structure. A system of this type is illustrated schematically in FIGS. 1 to 3 of the accompanying drawings.

As shown in FIGS. 1 and 2, stackable containers, known as storage bins or containers 10, are stacked on top of one another to form stacks 12. The stacks 12 are arranged in a grid framework structure 14 in a warehousing or manufacturing environment. The grid framework is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

In detail, the grid framework structure 14 comprises a plurality of vertical uprights or upright members or upright columns 16 that support horizontal grid members 18, 20. A first set of parallel horizontal grid members 18 is arranged perpendicularly to a second set of parallel horizontal grid members 20 to form a grid structure or grid 15 comprising a plurality of grid cells 17. The grid cell has an opening to allow a load handling device to lift a container or storage bin through the grid cell. In the grid structure, the first set of parallel horizontal grid members 18 intersect the second set of parallel horizontal grid members at nodes. The grid structure is supported by the upright members 16 at each of the nodes or at the point where the grid members intersect such that the upright members are interconnected at their tops ends by the intersecting grid members. The grid members 16, 18, 20 are typically manufactured from metal and typically welded or bolted together or a combination of both. The storage bins or containers 10 are stacked between the upright members 16 of the grid framework structure 14, so that the upright members 16 guard against horizontal movement of the stacks 12 of bins 10, and guide vertical movement of the storage bins 10.

The top level of the grid framework structure 14 includes rails 22 arranged in a grid pattern across the top of the stacks 12. Referring additionally to FIG. 3, the rails 22 support a plurality of load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device otherwise known as a bot 30 shown in FIGS. 4 and 5 comprising a vehicle body 32 is described in PCT Patent Publication No. WO2015/019055 (Ocado), hereby incorporated by reference, where each load handling device 30 only covers a single grid space or grid cell of the grid framework structure 14. Here, the load handling device 30 comprises a wheel assembly comprising a first set of wheels 34 consisting of a pair of wheels on the front of the vehicle body 32 and a pair of wheels 34 on the back of the vehicle 32 for engaging with the first set of rails or tracks to guide movement of the device in a first direction, and a second set of wheels 36 consisting of a pair of wheels 36 on each side of the vehicle 32 for engaging with the second set of rails or tracks to guide movement of the device in a second direction. Each of the sets of wheels are driven to enable movement of the vehicle in X and Y directions respectively along the rails. One or both sets of wheels can be moved vertically to lift each set of wheels clear of the respective rails, thereby allowing the vehicle to move in the desired direction, e.g. X or Y direction, on the grid structure.

The load handling device 30 is equipped with a lifting device or crane mechanism to lift a storage container from above. The crane mechanism comprises a winch tether or cable 38 wound on a spool or reel (not shown) and a grabber device 39 in the form of a lifting frame. The lifting device comprises a set of lifting tethers 38 extending in a vertical direction and connected nearby or at the four corners of the lifting frame 39, otherwise known as the grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess or container receiving space 40, in the lower part. The recess is sized to accommodate the container 10 when it is lifted by the crane mechanism, as shown in FIG. 5 (a and b). When in the recess, the container is lifted clear of the rails beneath, so that the vehicle can move laterally to a different location. On reaching the target location, for example another stack, an access point in the storage system or a conveyor belt, the bin or container can be lowered from the container receiving space and released from the grabber device. The container receiving space may comprise a cavity or recess arranged within the vehicle body, e.g. as described in WO 2015/019055 (Ocado Innovation Limited). Alternatively, the vehicle body of the load handling device may comprise a cantilever as taught in WO2019/238702 (Autostore Technology AS), in which case the container receiving space is located below a cantilever of the load handing device. In this case, the grabber device is hoisted by a cantilever such that the grabber device is able to engage and lift a container from a stack into a container receiving space below the cantilever.

To ensure the stability of the grid framework structure, prior art storage systems are largely dependent on various supports and bracing arranged within or at least partly along the periphery of the grid framework structure. However, the use of various supports and bracing (anti-movement braces)

to stabilise the grid framework structure from internal and external forces is disadvantageous for a number of reasons. The grid framework structure occupies space or area which could be utilised to store containers; in that it prevents optimum usage of available space or area for the storage of containers. The need of a supporting structure may limit the available options for positioning of the grid framework structure, since any auxiliary grid supporting structure often requires connection to a surrounding structure such as the inner walls of a building. The requirement of a supporting structure to stabilise the grid framework structure is generally not cost efficient and occupies useful storage space.

WO2019/101367 (Autostore Technology AS) teaches a free-standing storage grid requiring a less extensive auxiliary grid supporting structure by integrating a grid supporting structure in the storage grid structure. The grid supporting structure is made up of four storage columns interconnected by multiple vertically inclined support struts. The storage column profiles have a cross-section comprising a hollow centre section and four corner sections, each corner section comprising two perpendicular bin guiding plates for accommodating a corner of a storage bin. The support struts have a width which allows them to fit in between two parallel guiding plates so as to not compromise the ability of the storage columns to accommodate a stack of containers or storage bins.

To erect the grid framework structure in the art, a plurality of vertical uprights are individually positioned in a grid-like pattern on the ground. The height of the vertical uprights, and thus the level of the grid mounted thereon, is adjusted by one or more adjustable feet at the base or bottom end of each of the vertical uprights. A sub-group of the vertical uprights are braced together to provide structural stability to the grid framework structure. The vertical uprights are interconnected at their top ends by grid members so that the grid members adopt the same grid pattern as the vertical uprights, i.e. the vertical uprights support the grid members at the points where each of the grid members intersect in the grid pattern. For the purpose of explanation of the present invention, the points or junctions where the grid members intersect or are interconnected constitute the nodes of the grid structure and correspond to the areas where the grid structure is supported by a vertical upright. The resultant grid framework structure can be considered as a free standing rectilinear assemblage of upright columns supporting the grid formed from intersecting horizontal grid members, i.e. a four wall shaped framework.

The arrangement of the vertical uprights provides multiple vertical storage columns for the storage of one or more containers in a stack. The vertical uprights help to guide the grabber device of the lifting mechanism as it engages with a container within the grid framework structure and is lifted towards the load handling device operative on the grid. The size of the grid framework structure, and thus the ability to store containers containing different items or stock keeping units (SKUs), is largely dependent on the number of vertical uprights spanning over a given footprint of the grid framework structure. However, one of the biggest bottlenecks in the building of a fulfilment or distribution centre is the erection of the grid framework structure. The time and cost to assemble the grid framework structure represents a huge proportion of the time and cost to build a fulfilment or distribution centre. The biggest and the most time consuming operation involves erecting the vertical uprights individually and fixing the grid structure to the vertical uprights.

A grid framework structure is thus required that allows the grid framework structure to be erected quicker and/or cheaper than current grid framework structures in the art. Moreover, the grid framework structure should also maximise the available space or area for the storage of multiple containers.

In addition to being able to being erected much quicker than current grid framework structures in the art, the grid framework structure is subjected to various external and internal forces. These include but are not limited to ground movement, which can be attributed to the composition of the ground or soil type, forces developed by the movement of the load handling devices (which can weigh in excess of 100 kg) on the grid framework structure, movement as a result of nearby constructions or moving vehicles such as trains, or even forces due to movement during an earthquake or storm. It is paramount to keep the individual elements within the grid framework structure intact as a result of such external forces experienced by the grid framework.

To ensure stability of the grid framework structure, prior art storage systems are largely dependent on various supports and bracing arranged within or at least partly along the periphery of the grid. However, the use of various supports and bracing (anti-movement braces) to stabilise the grid framework structure from internal and external forces is disadvantageous for a number of reasons. A supporting structure around or within the grid framework structure occupies space or area which could be utilised by the grid to store containers; it prevents optimum usage of available space or area for the storage of containers. The need of a supporting structure may limit the available options for positioning of the grid framework structure since any auxiliary grid supporting structure often requires connection to a surrounding structure such as the inner walls of a building, and the requirement of a supporting structure is not cost efficient.

A grid framework structure is thus required that minimises the impact of the supporting structure on available space or area for the storage of containers, so as to provide a free-standing storage grid or at least requiring a less extensive auxiliary grid support structure.

Much of the world's population is located along seismic fault lines or in the paths of powerful storms such as hurricanes and tornadoes. Locating the grid frame structure in such areas carries a risk of structural damage from seismic and storm events, as the current grid framework structure may not hold the grid structure together. Powerful seismic and storm events may result in the failure of the structural integrity of the grid framework structure, e.g. as a result in the inability of the structural fasteners to keep the grid firmly attached to the upright members.

Earthquakes can be labelled into four categorises labelled as Type A, B, C, or D depending on the severity of the earthquake, whereby Type A is considered the least powerful earthquake and Type D is considered the most powerful earthquake. Types A-D can be graded by their spectral acceleration, which is the maximum acceleration measured in g that an object, above ground level, will experience during an earthquake. Type D is considered to represent the most powerful seismic event and typically has a measured spectral acceleration in the region 0.5 g to 1.83 g (short period spectral response acceleration SDS see https://www.fegstructural.com/seismic-design-category-101/), and is the cause of most failure of buildings. As powerful seismic events act on a structure, the three dimensional dynamic forces compromise the structural fasteners holding the grid framework structure together, causing them to work their way loose or out of the members in which they are embedded, or, if the structural fasteners remain in place, dynamic forces may cause the structural fasteners to break.

Many jurisdictions, such as the US states, have passed laws mandating that all new buildings, residential or commercial, be constructed with certain seismic bracing features incorporated therein. A grid framework structure comprises internal bracing features incorporated within the grid framework structure whereby one or more of the upright members are braced together by one or more bracing members or bracing towers. Typically, the bracing members are distributed internally throughout the grid framework structure. The distribution of the internal bracing is largely dependent on the size of the grid framework structure, the ground condition and the environmental condition such as temperature. However, whilst the grid framework structure is able to withstand very low level seismic events having a spectral acceleration less than 0.3 g, presently there are no earthquake restraint system for a grid framework structure that is able to withstand more powerful Type C and Type D seismic events categorised by a spectral acceleration in the region of 0.5 g to 1.83 g.

This application claims priority from GB application number GB2013968.9 filed on 4 Sep. 2020, the contents being herein incorporated by reference.

SUMMARY OF INVENTION

The present applicant has mitigated the above problems by providing a grid framework structure configured to support one or more load handling devices thereupon, said grid framework structure comprising:

i) a grid structure comprising a plurality of grid cells, ii) a load bearing framework, wherein the grid structure is suspended from the load bearing framework by three or more tension elements connected to a respective number of suspension points on the grid structure, each of the three or more tension elements having a length configured to suspend the grid structure in a substantially horizontal plane.

There are different ways to suspend the grid structure from above by a load bearing framework that fall within the scope of the present invention. For the purpose of the present invention, the term "suspend" covers suspending the grid structure from above. The grid structure can be suspended from a single or from multiple load bearing mounting points on the load bearing framework. For example, the grid structure can be suspended from the load bearing framework by three or more tension elements connected to or anchored to a single load bearing mounting point. Alternatively the grid structure can be suspended from the load bearing framework by tension elements connected to or anchored to a respective number of load bearing mounting points on the load bearing framework. A respective number of load bearing mounting points here means that an equivalent number of tension elements are connected to or anchored to an equivalent number of load bearing mounting points for suspending the grid structure from the load bearing framework.

Suspending the grid structure comprising a plurality of grid cells from above by a load bearing framework removes the need to support the grid structure at each of the nodes or at the points where the grid members intersect by a separate vertical upright. One of the biggest bottlenecks in the building of a fulfilment or distribution centre is erecting the vertical uprights individually and fixing the grid structure to the vertical uprights at each of the nodes where the grid members intersect. Conventional wisdom in the industry is of the opinion that the grid structure needs to be supported by a vertical upright at each node or junction where the grid members intersect or are interconnected in order to: (i) support one or more load handling devices operative on the grid structure; and (ii) to help guide the grabber device of the load handling device into engagement with a container in a stack. Each of the vertical uprights can be considered to function as a structural element under compression for supporting the grid structure above.

However, in contradistinction to conventional wisdom, the present invention has realised that suspending the grid structure from a load bearing framework removes the need to guide the containers or storage bins in a stack along the vertical uprights.

In the present invention, it is realised that the grabber device and the lifting tethers used to engage and lift a container from storage towards the grid structure are stable enough to sufficiently lift the container vertically through a grid cell towards the load handling device without excessive swaying or fouling or hitting the grid cell or another container from an adjacent stack as the container approaches the grid. Typically, the load handling device is equipped with a lifting device or crane device arranged to lift a storage container from above. The lifting device comprise a set of lifting tethers extending in a vertical direction and connected at the four corners of a lifting frame, otherwise known as a grabber device (one tether near each of the four corners of the grabber device) for releasable connection to a storage container. The grabber device is configured to releasably grip the top of a storage container to lift it from a stack of containers in a storage system of the type shown in FIGS. 1 and 2. The lifting tethers supporting the grabber device at the four corners are sufficiently stable as the grabber device is hoisted in a near vertical direction towards the grid structure along a vertical axis, with little or no swaying of the grabber device and the container engaged thereon.

The removal of the vertical uprights at the nodes of the grid structure allows multiple adjacent stacks of containers to be stored side by side, each stack of containers located below a respective grid cell such that a load handling device operative on the grid structure is able to hoist the relevant container from storage. The removal of the vertical uprights for guiding the containers towards the grid structure minimises the effect of the vertical uprights impacting on the available space or area for the storage of containers. As a result, stacks of one or more containers can be stored closer together, and therefore occupy spaces that were once occupied by the vertical uprights.

To ensure that the grid structure is level, preferably the grid structure is suspended from the corners of or proximal to the corners of the grid structure. By suspending the grid structure from the corners of the grid structure, the level of the grid structure can be adjusted so that it lies in a substantially horizontal plane. The number of tension elements will depend on the shape of the grid structure. For a square or rectilinear grid structure, at least four tension elements will be required to ensure that the grid structure is level. Equally, for a triangular grid structure at least three tension elements are necessary to ensure that the grid structure is level.

For the purpose of the present invention, the ensuring that the grid structure is level involves ensuring that the grid structure lies in a substantially horizontal plane. Optionally, at least one of the three or more tension elements comprises a tether or cable or a beam.

Optionally, the grid structure comprises an assembly of modular units, each of the modular units comprising a plurality of grid cells. Optionally, the grid structure can be suspended from a ceiling of a building, in which case the load bearing framework is the ceiling of the building, where the ceiling is supported by the walls of the building. Optionally, the load bearing framework comprises one or more load bearing mounting points for suspending the grid structure. For example, the grid structure can be suspended from the load bearing framework by the three or more tension elements anchored to one or more load bearing mounting points and a respective number of suspension points anchored to the grid structure. Preferably, the load bearing framework structure comprises at least one vertical upright column. Optionally, the at least one vertical upright column comprises the one or more load bearing mounting points.

Optionally or alternatively, the load bearing framework further comprises a plurality or an assembly of trusses supported by the at least one vertical upright column. Preferably, the plurality or the assembly of trusses comprises a first set of trusses extending in the first direction and a second set of trusses extending in the second direction. Optionally, the first set of trusses are arranged in a parallel relationship to each other and/or the second set of trusses are arranged in arranged in a parallel relationship to each other.

Optionally, the at least one vertical upright column comprises a plurality of vertical uprights. Optionally, the plurality of vertical uprights are braced together by at least one of the plurality of trusses extending from each of the plurality of vertical uprights to provide a bracing structure for suspending the grid structure therefrom. Optionally, the bracing structure is substantially rectangular or square.

To compensate for the effects of the movement of the load bearing framework during, for example, a seismic activity or strong winds, preferably, the grid structure is configured to move horizontally relative to the load bearing framework, i.e. oscillate relative to the load bearing framework. The nature of the movement of the grid structure suspended from the load bearing framework can be envisaged to be similar to that of a pendulum of the same mass. If the load bearing framework were to be moved horizontally, the grid structure would not immediately respond to such movement, but remain relatively motionless relative to the original position of the load bearing framework, as would a pendulum. The suspension of the grid structure from the load bearing framework is thus isolated from the movement of the load bearing framework due to the tension or suspension elements suspending the grid structure. By virtue of suspending the grid structure from the load bearing framework, the grid structure can act like a Tuned Mass Damper (TMD), also called a "harmonic absorber", so as to reduce the amplitude of vibration of the load bearing framework to an acceptable level whenever a strong lateral force such as earthquake or high winds hit the grid structure. The suspended grid structure counteracts and absorbs the kinetic energy developed during oscillation of the load bearing framework. Preferably, the load bearing framework further comprises means for damping the movement of the grid structure relative to the load bearing framework. Damping the movement of the grid structure mitigates oscillation of the grid structure during movement of the load bearing framework as a result of a seismic event.

Preferably, the means for damping the movement of the grid structure comprises one or more dampers disposed between the load bearing framework and the grid structure. Preferably, the means for damping the movement of the grid structure comprises one or more tuned mass dampers, more preferably an adjustable tuned mass damper for tuning the damper's natural frequency. Optionally, the means for damping the movement of the grid structure comprises an elastic element. For example, the elastic element could be resilient material such as rubber. The oscillating mass of the grid structure and/or the mass of one or more load handing devices (bots) operative on the grid structure are tuned to vibrate out of phase with the movement of the load bearing framework during a seismic event. Preferably, the means for damping the movement of the grid structure is disposed between the at least one vertical upright column and the grid structure. Optionally, the means for damping the movement of the grid structure comprises a hydraulic damper.

To stabilise the grid structure during movement or operation of one or more load handling devices on the grid structure, particularly in the lateral direction, the one or more dampers are tuned to resist lateral movement of the grid structure below a predetermined force. The predetermined force is determined to prevent movement of the grid structure during normal operation of the one or more load handling devices on the grid structure. Preferably, the grid structure is anchored to one or more stabilisers for stabilising movement of the grid structure during normal operation of the one or more load handling devices on the grid structure. The one or more stabilisers are anchored between the load bearing framework and the grid structure. Preferably, the one or more stabilisers are configured to release when applied forces exceed a predetermined force that is representative of a seismic event so as to permit movement of the grid structure to counteract the movement of the load bearing framework. To assist with the movement of the grid structure, preferably the at least one of the respective number of suspension or mounting points on the grid structure comprises a pivotable joint.

Suspending the grid structure from the load bearing framework by three or more tension elements connected to a respective number of suspension points on the grid structure ensures that the grid structure substantially lies in a horizontal plane, as this will affect the direction in which the containers or storage bins are hoisted into the correct position through a grid cell. As the level of the grid structure deviates from the horizontal plane, this will not only put a strain on the one or more load handling devices travelling on the grid structure but will cause the lifting tethers to sway to one side depending on the direction of the deviation, and in a worst case scenario, cause the grabber device to fail to engage with the container or storage bin below. Preferably, at least one of the three or more tension elements is extendible. Preferably, the at least one of the three or more tension elements comprises or is anchored to an adjustment mechanism such that the length of the at least one of the three or more tension elements is adjustable. Preferably, the tension element comprises an inextensible portion and the adjustment mechanism, wherein the inextensible portion is connected to the adjustment mechanism. Preferably, the adjustment mechanism is motorised such that the adjustment of the length of the at least one of the three or more tension elements is motorised. The motorisation of the adjustment mechanism to adjust the length of the at least one of the three or more tension elements improves the flexibility by which the adjustment of the level of the grid structure can be automated, e.g. remotely.

To provide a lightweight grid structure that has sufficient structural integrity to resist the forces of one or more load handling devices operative on the grid structure, preferably the grid structure comprises an assembly of trusses. Preferably, the grid structure comprises:

i) an upper grid structure; and ii) a lower grid structure, each of the upper grid structure and the lower grid structure comprising a plurality of grid cells, the upper grid structure being vertically spaced from the lower grid structure such that the grid cells in the upper grid structure are in registration with the grid cells in the lower grid structure, wherein the upper grid structure and the lower grid structure are connected together by a plurality of diagonal and straight bracing members to form an assembly of trusses.

The upper grid structure and the lower grid structure connected together by a plurality of diagonal and straight bracing members can be regarded as a truss assembly comprising a plurality of equally spaced, parallel trusses lying in a horizontal plane. Each of the plurality of trusses can be considered as comprising an upper elongated truss member (upper chord) and a lower elongated truss member (lower chord) connected together by one or more diagonal braces and one or more straight vertical webs. The upper and lower elongated truss members respectively form upper and lower chords of an individual truss. The upper chord is typically placed in compression and the lower chord is typically placed in tension under the weight of one or more load handling devices operative on the grid structure. The plurality of trusses are connected together in a parallel arrangement but are separated or spaced apart by a plurality of straight horizontal upper cross webs between neighbouring upper elongated truss members or chords. Equally, a plurality of straight horizontal lower cross webs connect between neighbouring lower elongated truss members or lower chords. The plurality of straight horizontal upper cross webs are substantially equally spaced or separated along the longitudinal length of the upper elongated truss members such that the upper elongated truss members and the plurality of straight horizontal upper cross webs connecting adjacent trusses together are arranged in a grid like pattern to form a grid structure (upper grid structure) comprising a plurality of grid cells. Equally, the plurality of straight horizontal lower cross webs are substantially equally spaced along the longitudinal length of the lower elongated truss members such that the lower elongated truss members and the plurality of straight horizontal lower cross webs connecting adjacent trusses together are arranged in a grid like pattern to form a grid structure (lower grid structure) comprising a plurality of grid cells.

Preferably, the plurality of diagonal and straight bracing members extend between the upper and lower grid structure. Optionally, the plurality of diagonal bracing members are arranged to form a K brace between the upper grid structure and the lower grid structure. However, other bracing assemblies are permissible in the present invention including but not limited to an X brace. Forming the grid structure from a plurality of trusses allows the grid structure to be fabricated from lightweight materials. For example, the grid structure can be fabricated from a fibre reinforced composite material. In yet another option, the grid structure is fabricated from a polymer material.

Preferably, the grid structure comprises a first set of grid members extending in a first direction and a second set of grid members extending in a second direction, the first direction being substantially perpendicular to the second direction. The first set of grid members and the second set of grid members are arranged to form the grid structure comprising a plurality of cells. In the case where the grid structure comprises an upper grid structure and a lower grid structure, each of the upper and the lower grid structures comprise a first set of grid members extending in the first direction and a second set of grid members extending in the second direction to form a plurality of grid cells. To permit one or more load handling devices to travel on the grid structure, the first set of grid members comprises a first set of tracks and the second set of grid members comprises a second set of tracks. Optionally, the first set of grid members comprises a first set of track supports and the second set of grid members comprises a second set of track supports. Optionally, the first set of tracks are snap fitted to the first set of track supports, and the second set of tracks are snap fitted to the second set of track supports. Equally plausible in the present invention is that the plurality of tracks can be integrated into the first and second set of track supports such that the grid members of the grid structure comprise both the tracks and the track supports.

The present invention further provides a storage system comprising:

i) a grid framework structure of the present invention discussed above;

ii) a plurality of stacks of containers located below the grid structure, wherein each of the stacks of containers occupies a single grid space or grid cell;

iii) one or more load handling devices remotely operated to move the one or more containers stored in the grid framework structure, each of the one or more load handling devices comprising:

i) a wheel assembly for guiding the load handling device on the grid structure;

ii) a container-receiving space located above the grid structure; and iii) a lifting device arranged to lift a single container from a stack into the container-receiving space.

Preferably, the lifting device comprises a lifting drive assembly and a grabber device configured, in use, to releasably grip a container and lift a container from the stack into the container-receiving space, and a driving mechanism operatively arranged for moving the load handling device on the grid structure.

Optionally, the vehicle body houses the lifting device comprising the lifting drive assembly and the grabber device such that the grabber device is configured, in use, to releasably grip a container and lift the container from a stack in the grid framework structure into the container-receiving space. The container receiving space may comprise a cavity or recess arranged within the vehicle body, e.g. as described in WO 2015/019055 (Ocado Innovation Limited). Alternatively, the vehicle body of the load handling device may comprise a cantilever as taught in WO2019/238702 (Autostore Technology AS) in which case the container receiving space is located below a cantilever of the load handing device. In this case, the grabber device is hoisted by a cantilever such that the grabber device is able to engage and lift a container from a stack into a container receiving space below the cantilever. Optionally, the vehicle body houses a rechargeable power source.

DETAILED DESCRIPTION

Further features and aspects of the present invention will be apparent from the following detailed description of an illustrative embodiment made with reference to the drawings, in which.

Figure 1:
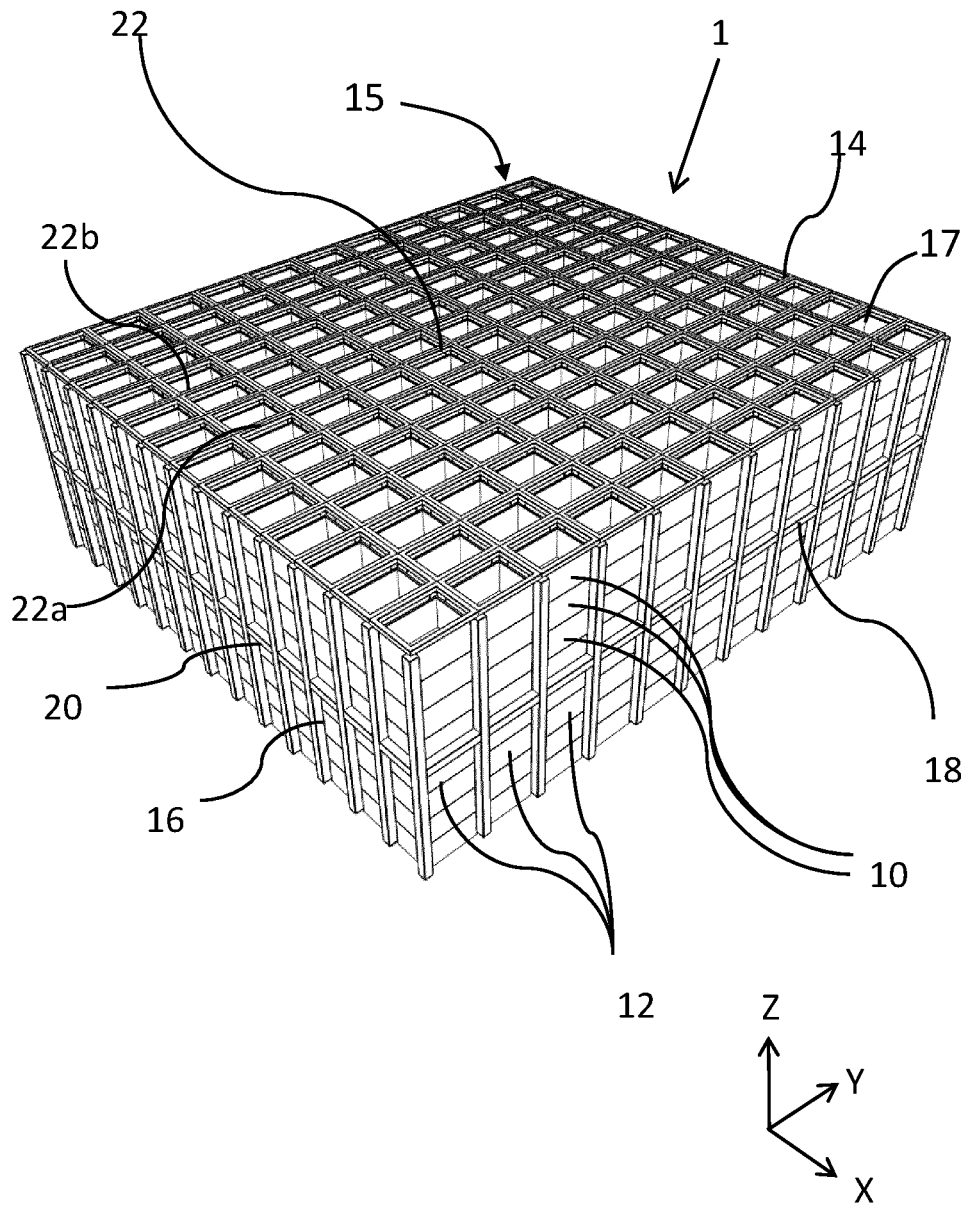
FIG. 1 is a schematic diagram of a grid framework structure according to a known system.
Figure 2:
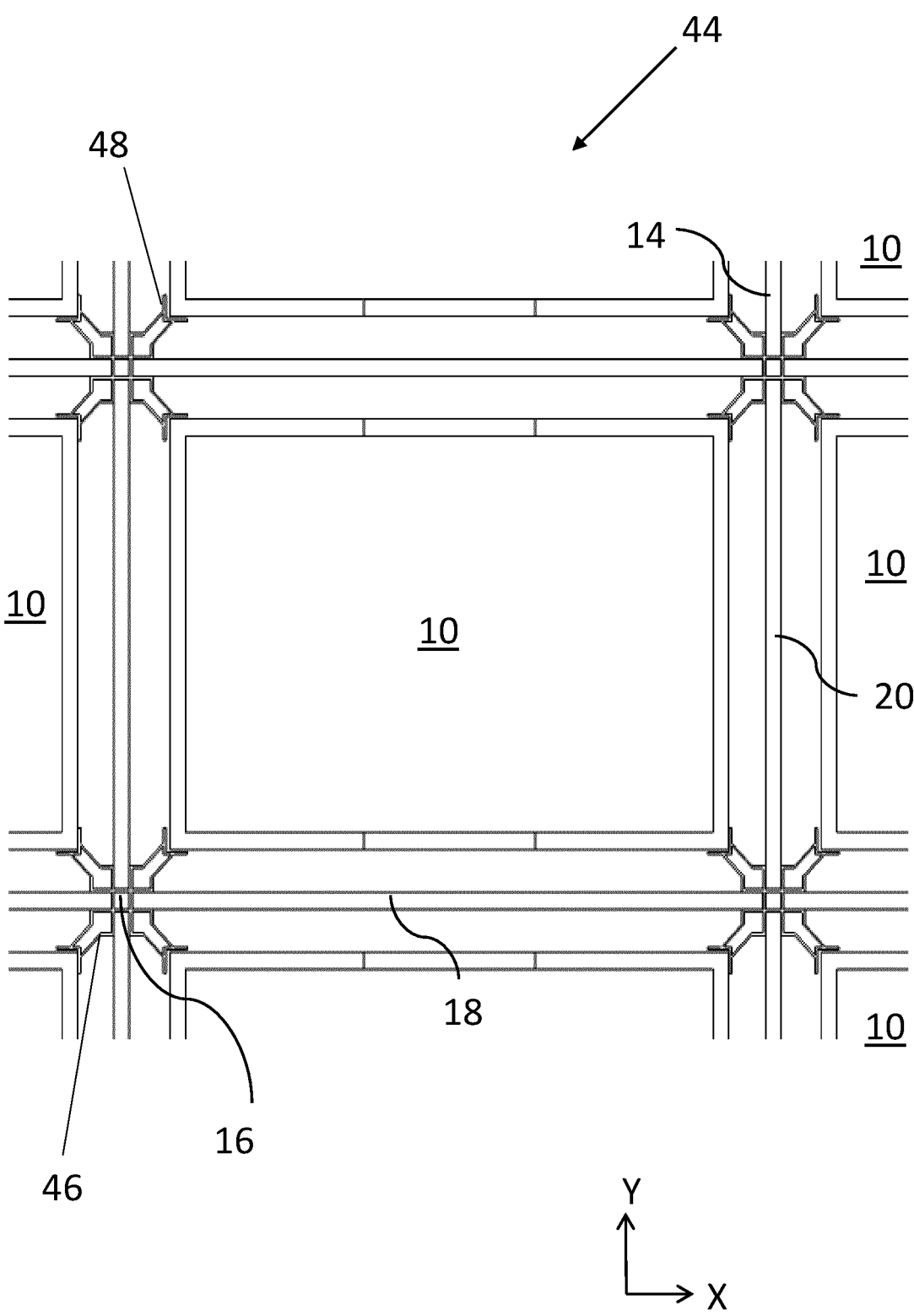
FIG. 2 is a schematic diagram of a top down view showing a stack of bins arranged within the framework structure of FIG. 1.
Figure 3:
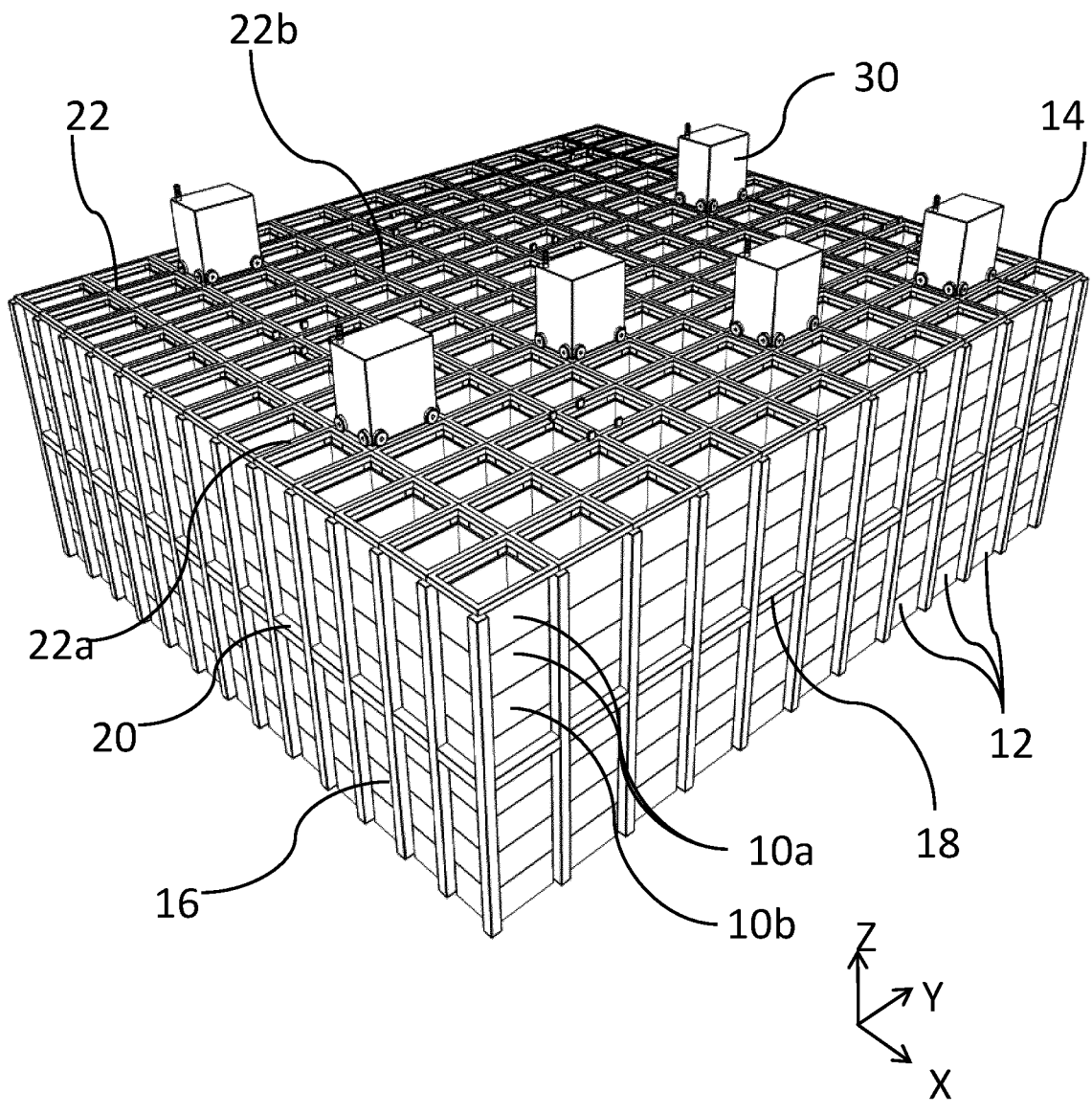
FIG. 3 is a schematic diagram of a known storage system showing a load handling device operative on the grid framework structure.
Figure 4:
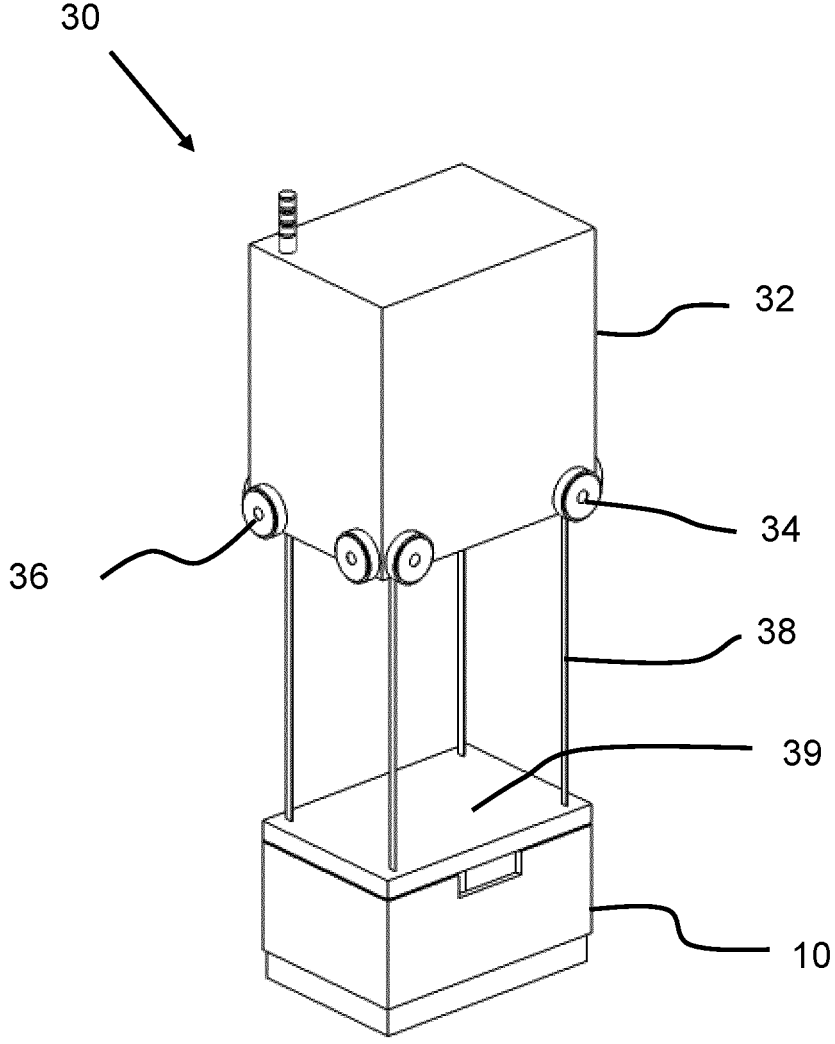
FIG. 4 is a schematic perspective view of the load handling device showing the lifting device gripping a container from above.
Figure 5:
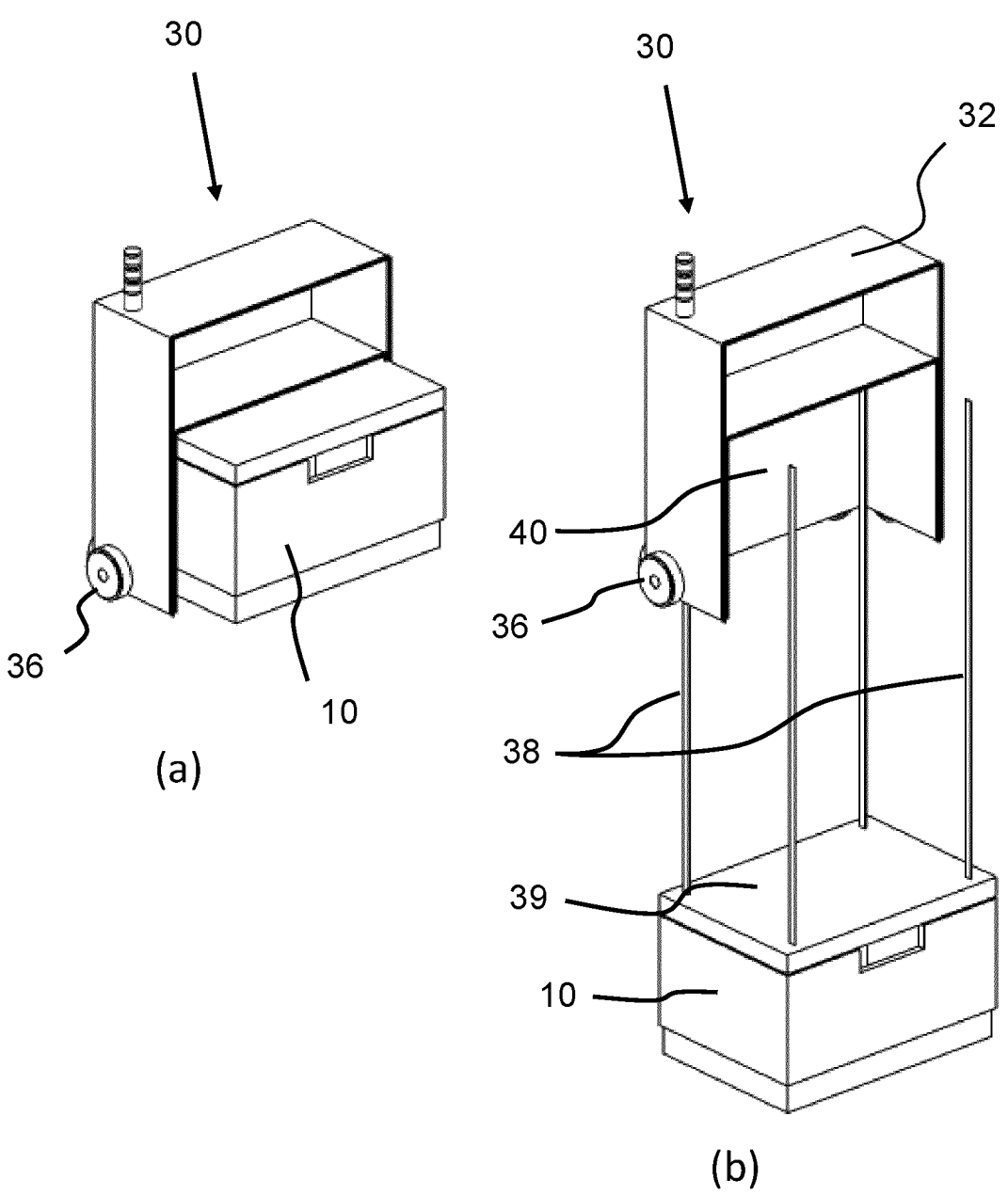

FIGS. 5(*a*) and 5(*b*) are schematic perspective cut away views of the load handling device of FIG. 4 showing (a) a container accommodated within the container receiving space of the load handling device and (b) the container receiving space of the load handling device.

Figure 6:
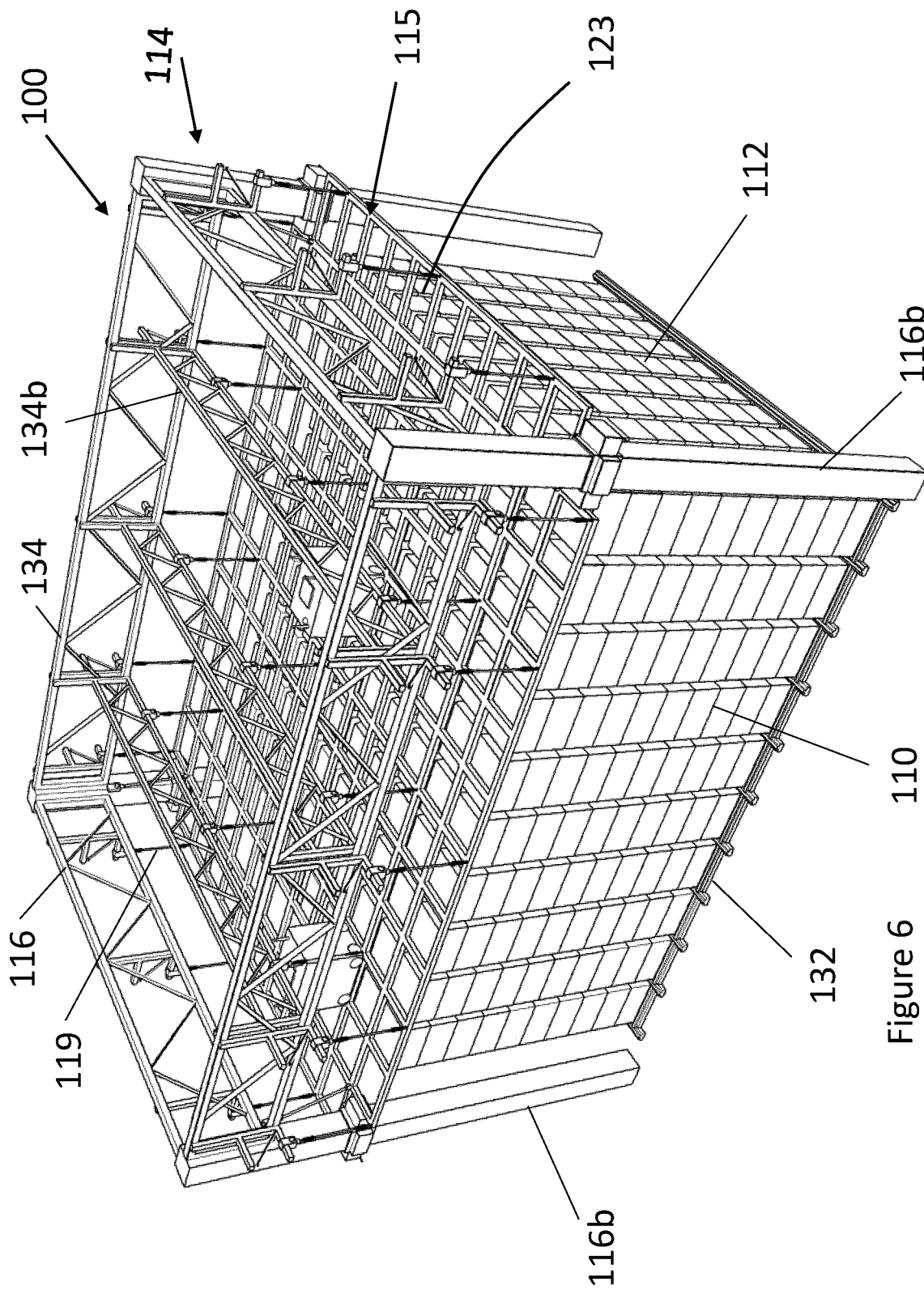

FIG. 6 is a schematic diagram of a storage system comprising a suspended grid structure according to a first embodiment of the present invention.

Figure 7:
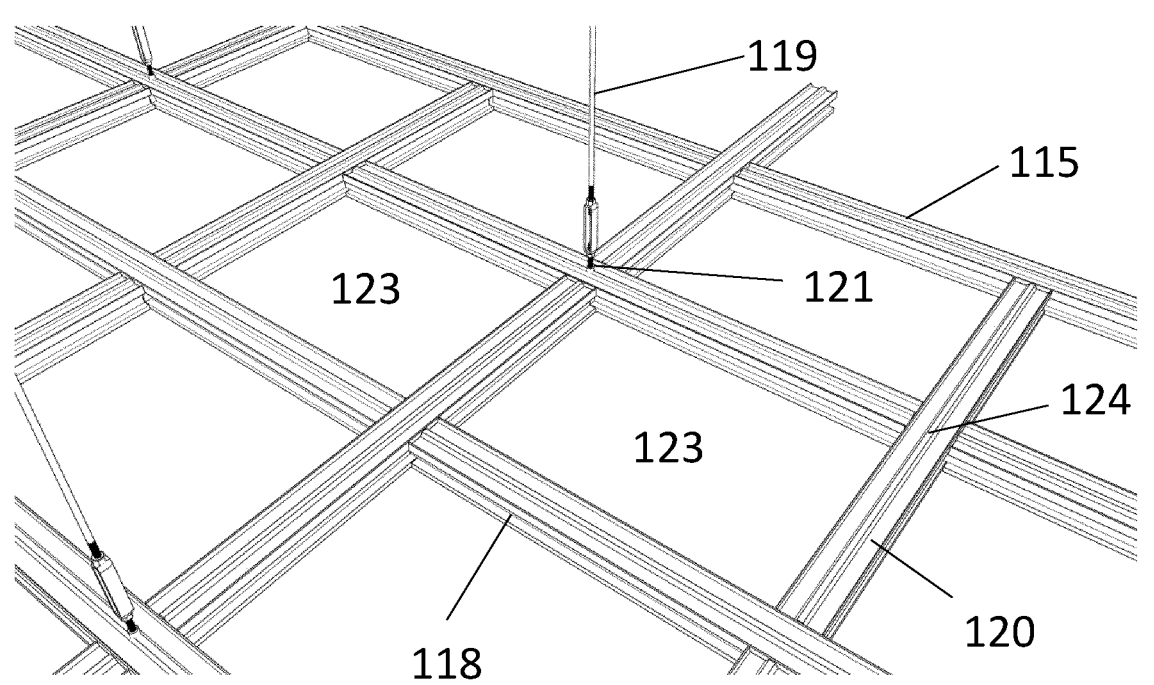

FIG. 7 is an expanded view of a portion of the grid structure showing the suspension points on the grid structure according to an embodiment of the present invention.

Figure 8:
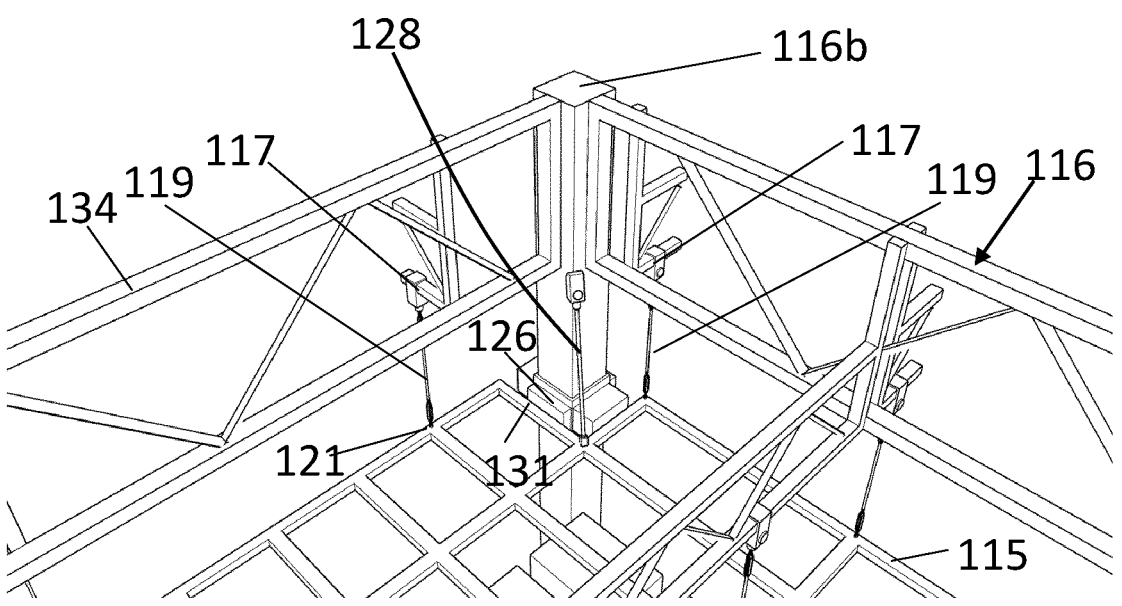

FIG. 8 is a perspective view of at least one stabiliser at a corner section of the grid structure for stabilising movement of the grid structure according to an embodiment of the present invention.

Figure 9:
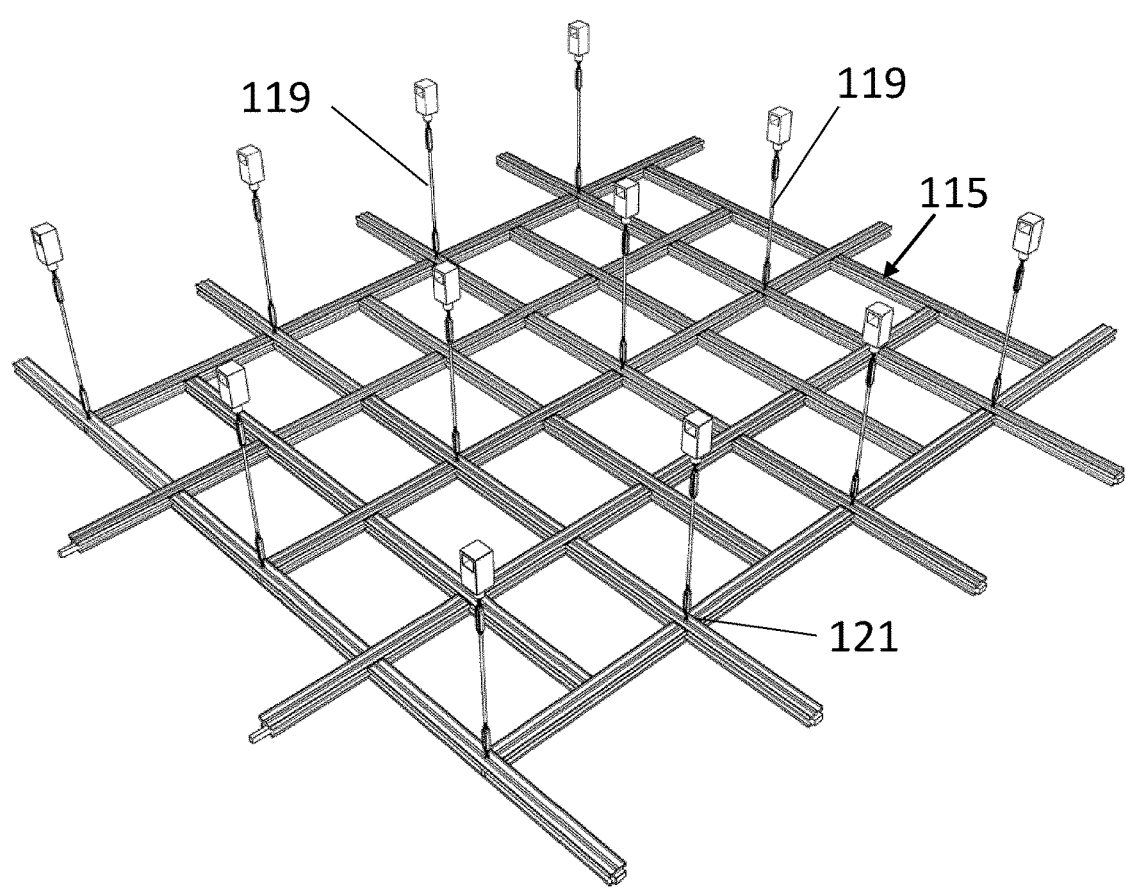

FIG. 9 is a perspective view showing the distribution of the suspension points across the grid structure according to the embodiment of the present invention.

Figure 10:
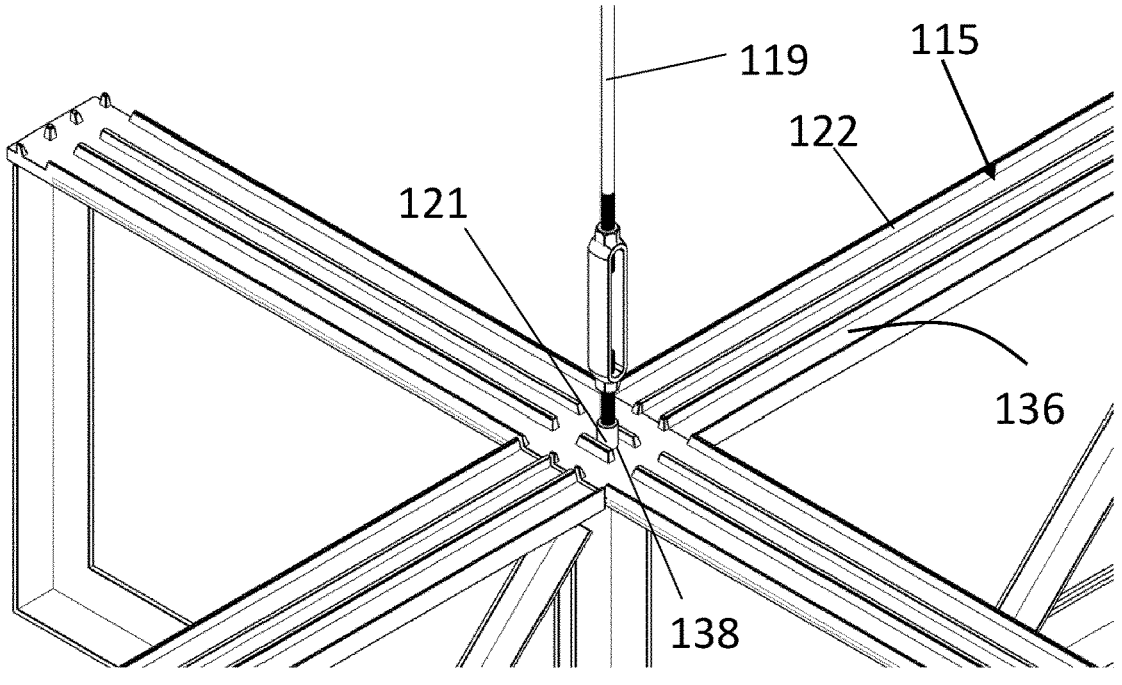

FIG. 10 is a perspective view of a portion of the grid structure showing the tension element anchored to a mounting or suspension point on the tracks of the grid structure according to the embodiment of the present invention.

Figure 11:
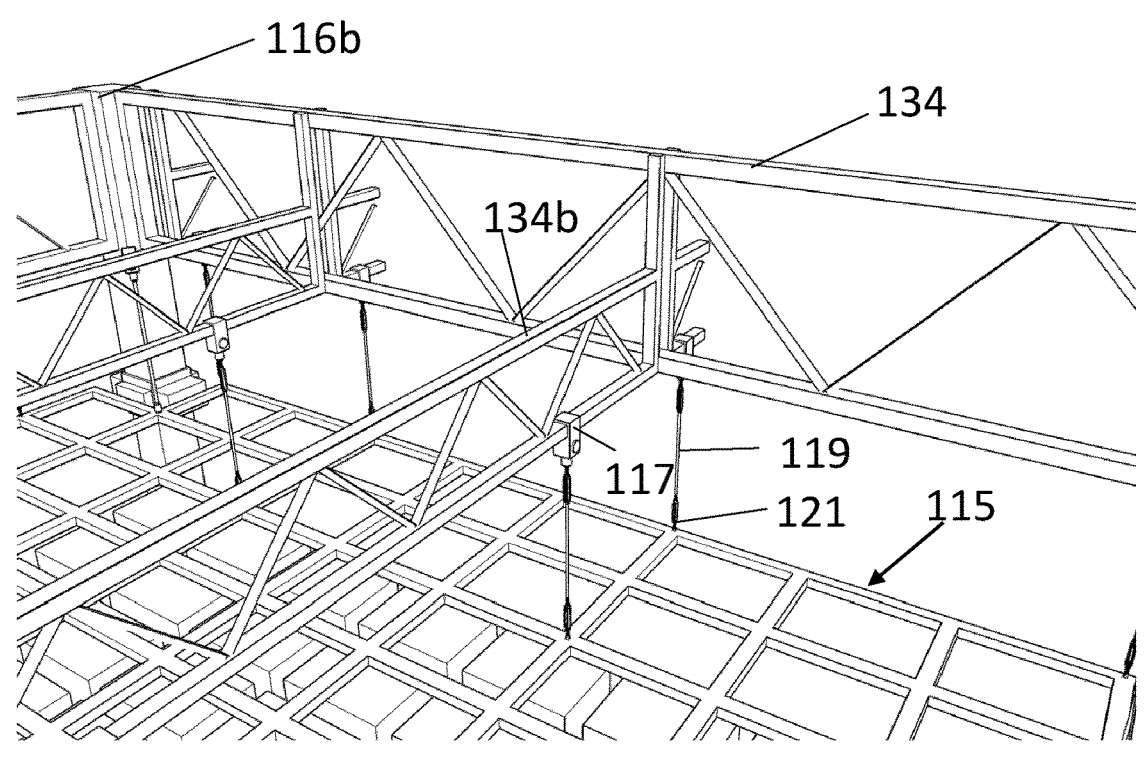

FIG. 11 is perspective view of a portion of the grid framework structure showing the grid structure suspended from the bracing members of the load bearing framework according to the embodiment of the present invention.

Figure 12:
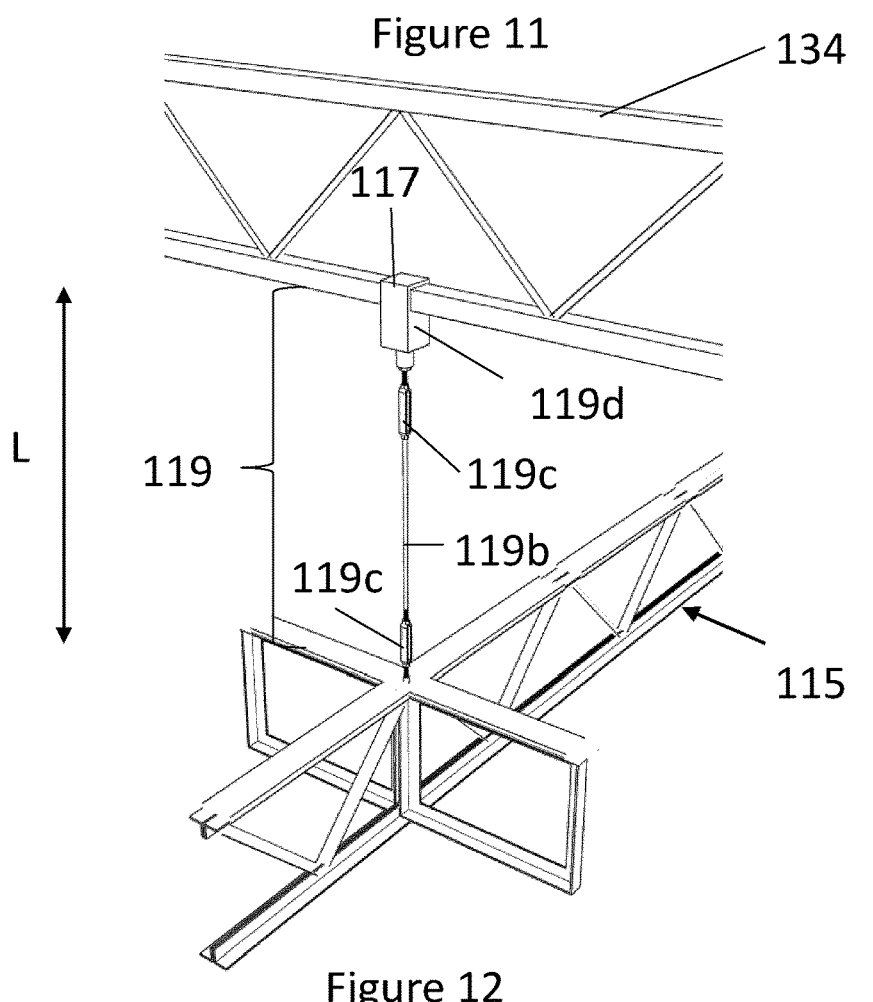

FIG. 12 is a perspective view of the tension or suspension element anchored to load bearing framework and the grid structure for suspending the grid structure from the load bearing framework according to the embodiment of the present invention.

Figure 13:
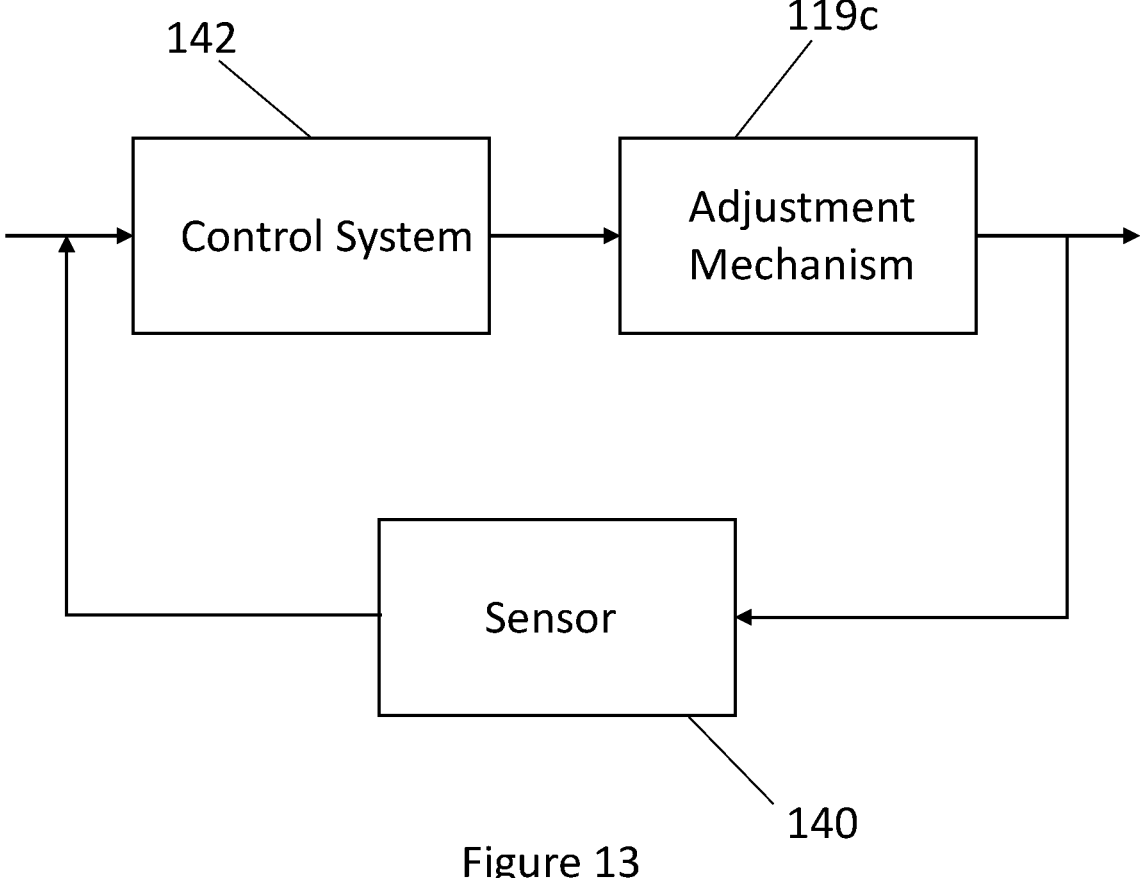

FIG. 13 is a block diagram of the feedback loop for automatically controlling the level of the grid structure according to an embodiment of the present invention.

Figure 14:
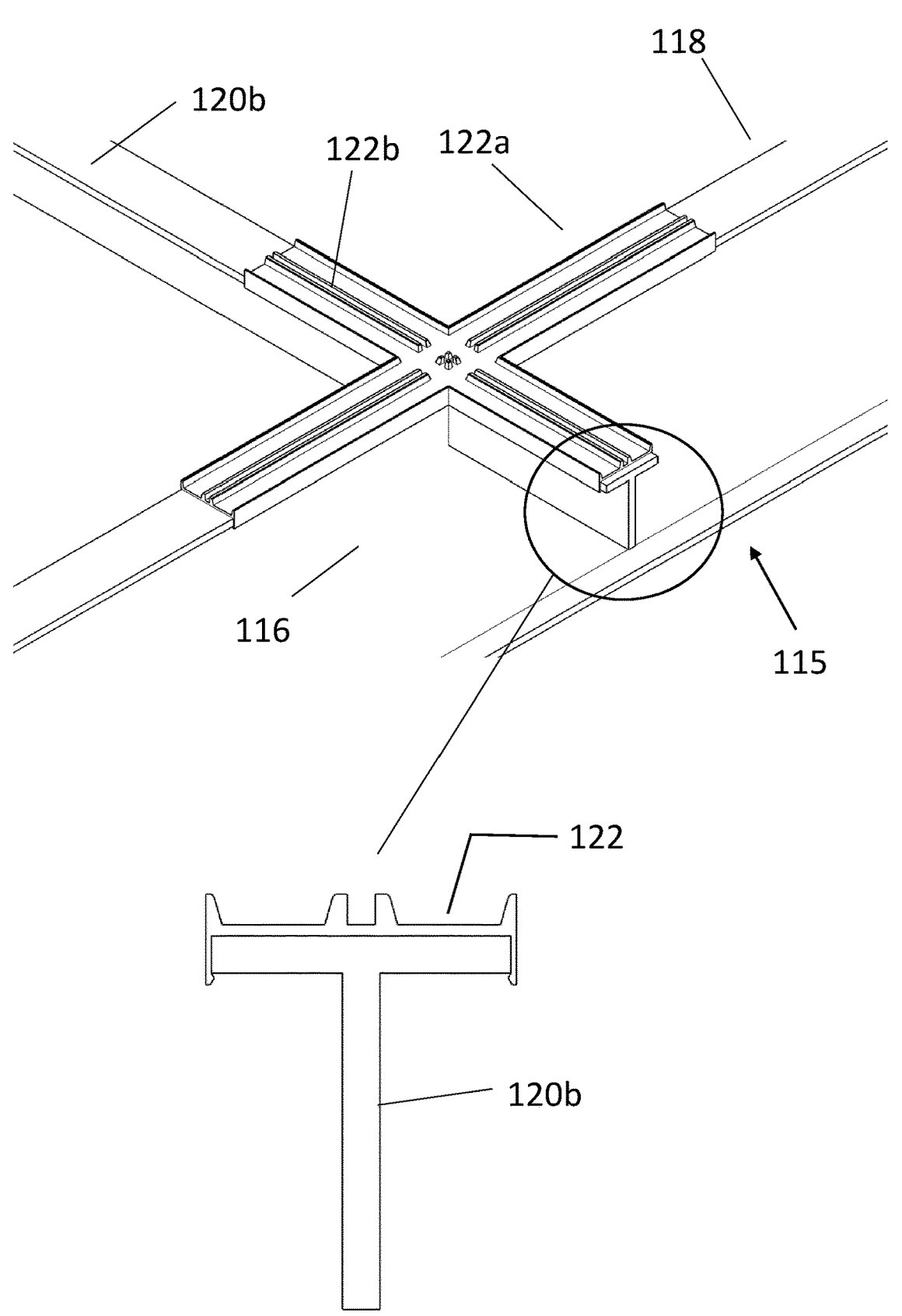

FIG. 14 is an expanded view of the grid structure of FIG. 11 at the node or intersection of the track supports showing the tracks mounted to the track support according to an embodiment of the present invention.

Figure 15:
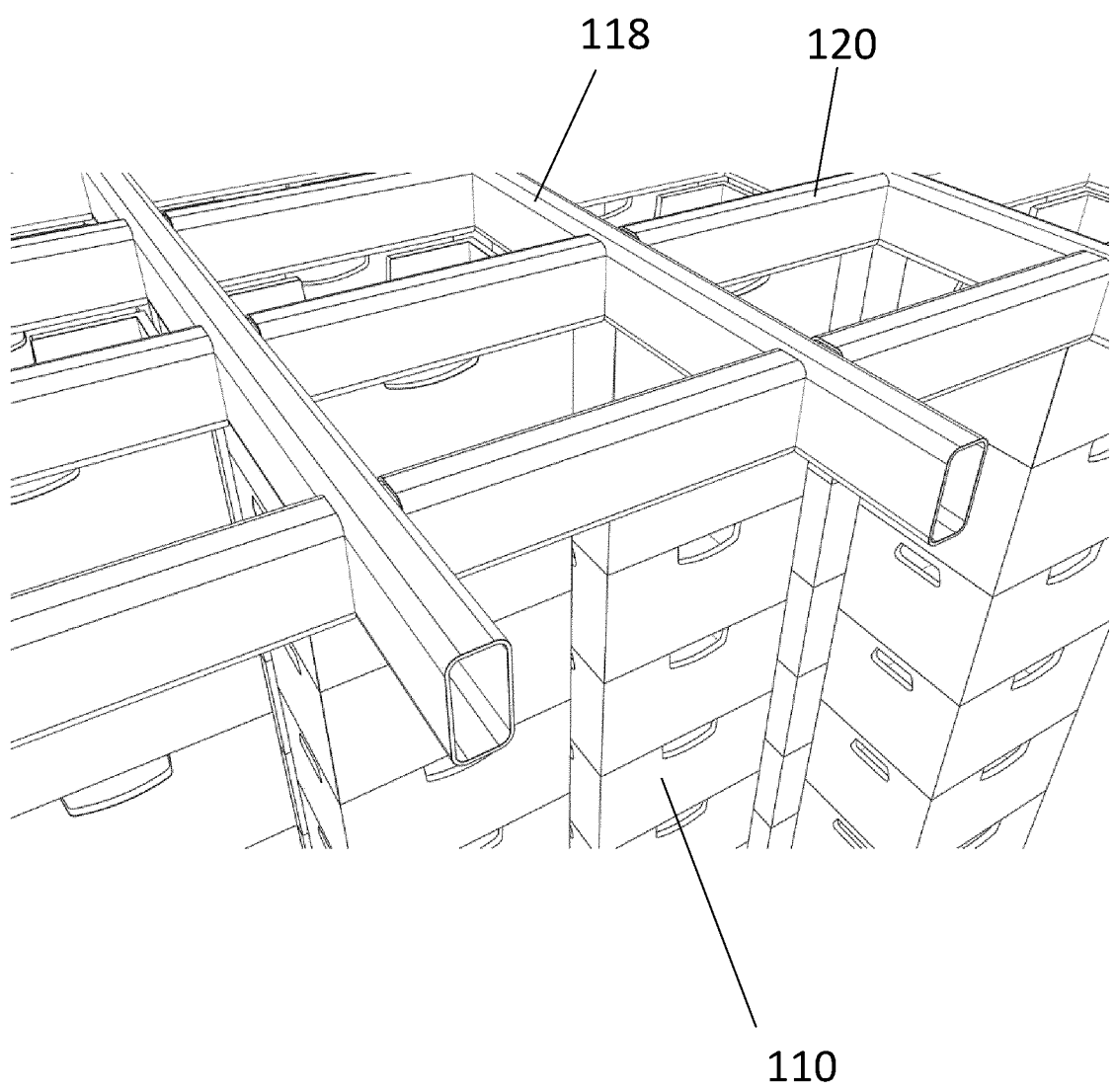

FIG. 15 is a perspective view showing the grid structure of the grid framework structure according to another embodiment of the present invention.

Figure 16:
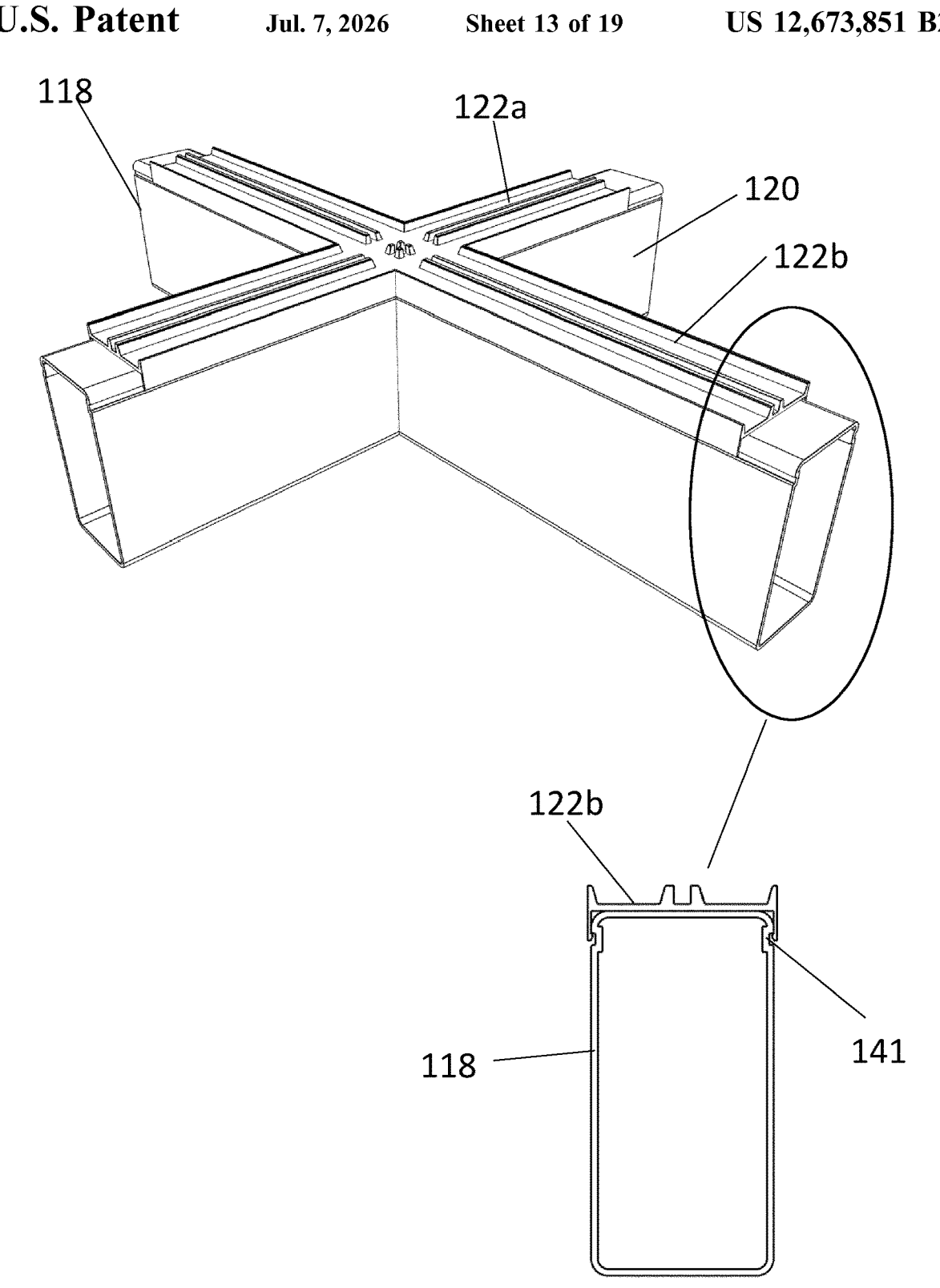

FIG. 16 is an expanded view of the intersection of the track supports of the grid structure of FIG. 15 showing tracks mounted onto the track supports.

Figure 17:
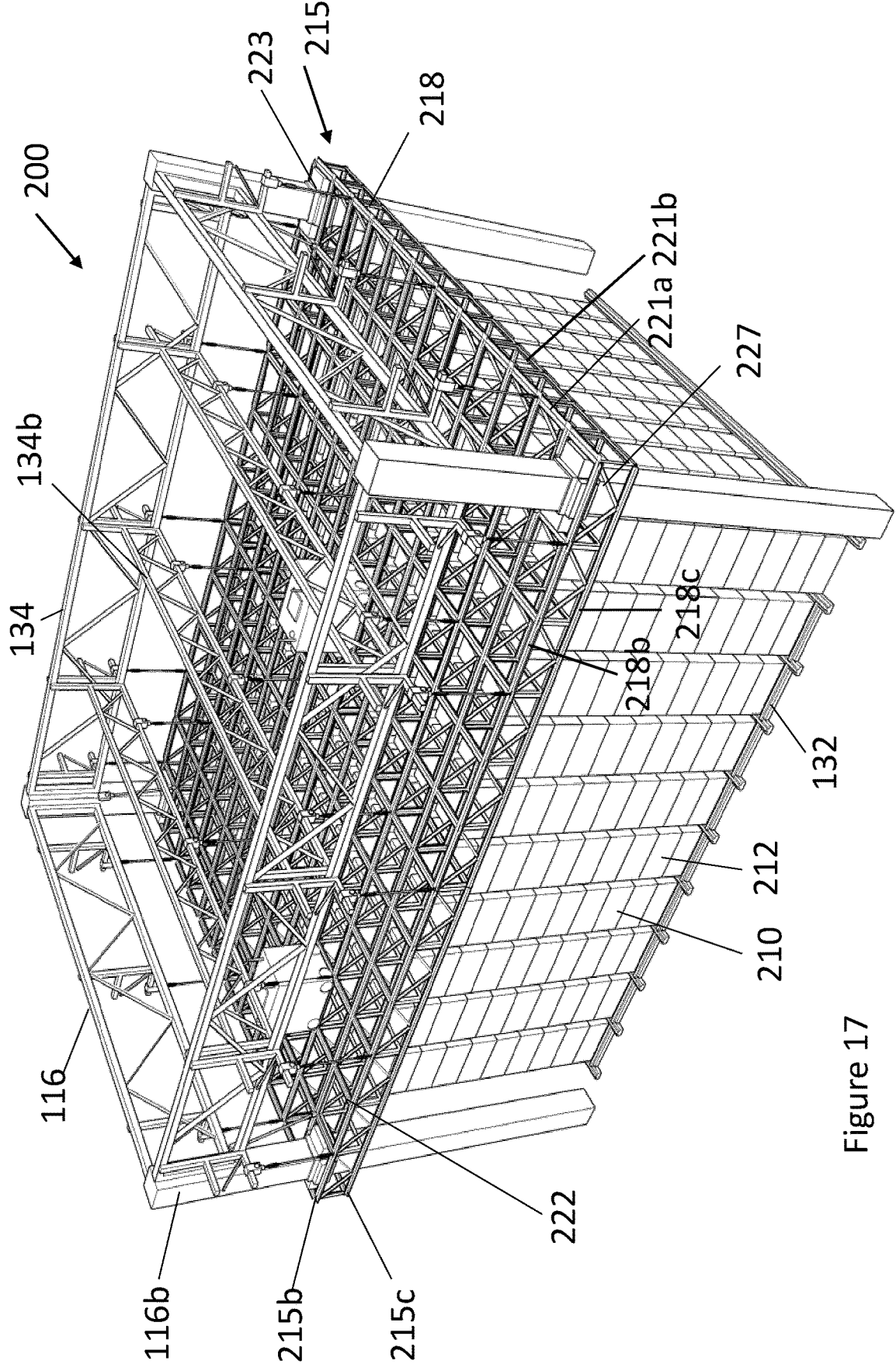

FIG. 17 is a perspective view of a storage system comprising the grid framework structure according to a second embodiment of the present invention.

Figure 18:
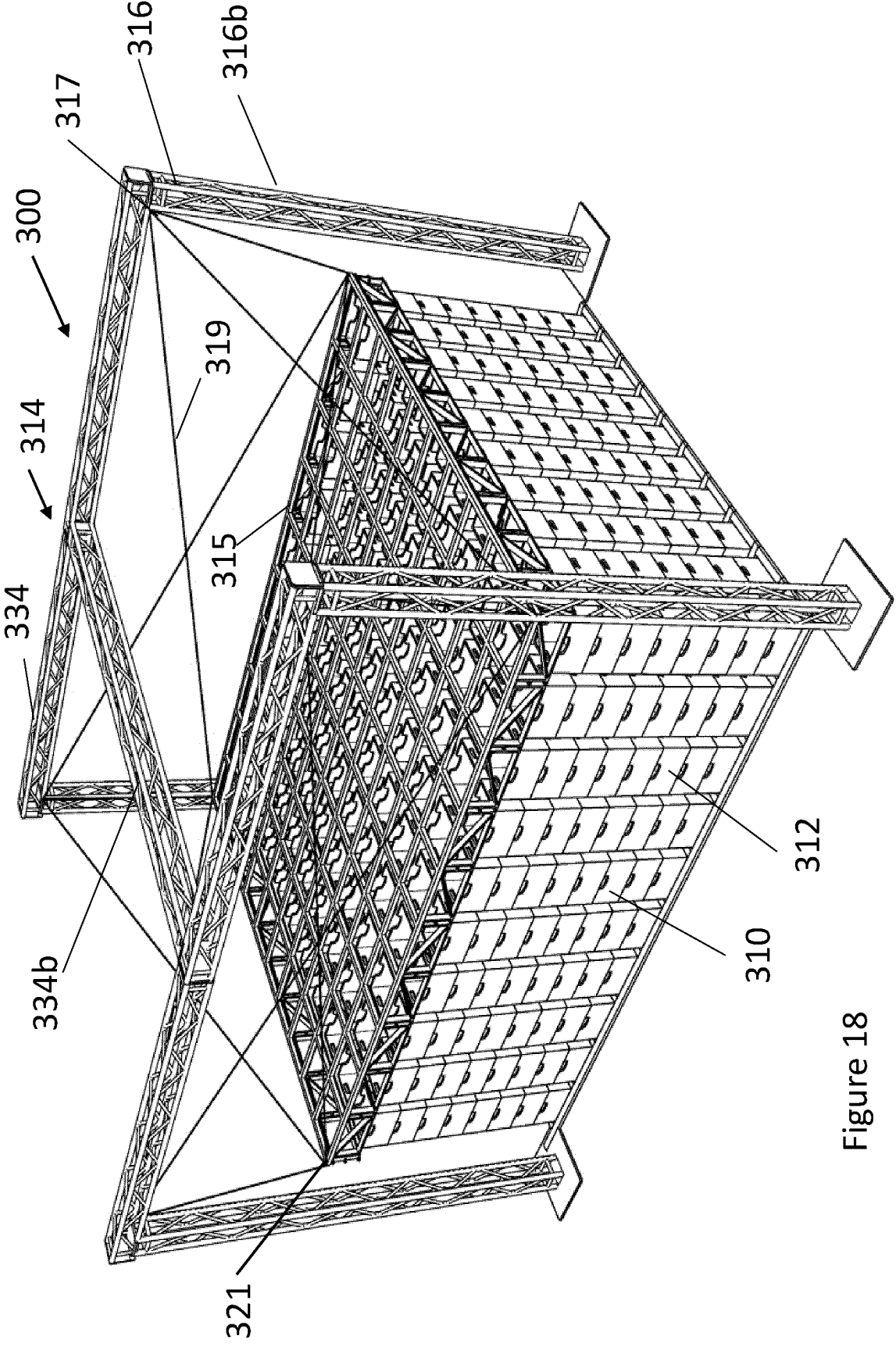

FIG. 18 is a perspective view of a storage system comprising the grid framework structure according to a third embodiment of the present invention.

Figure 19:
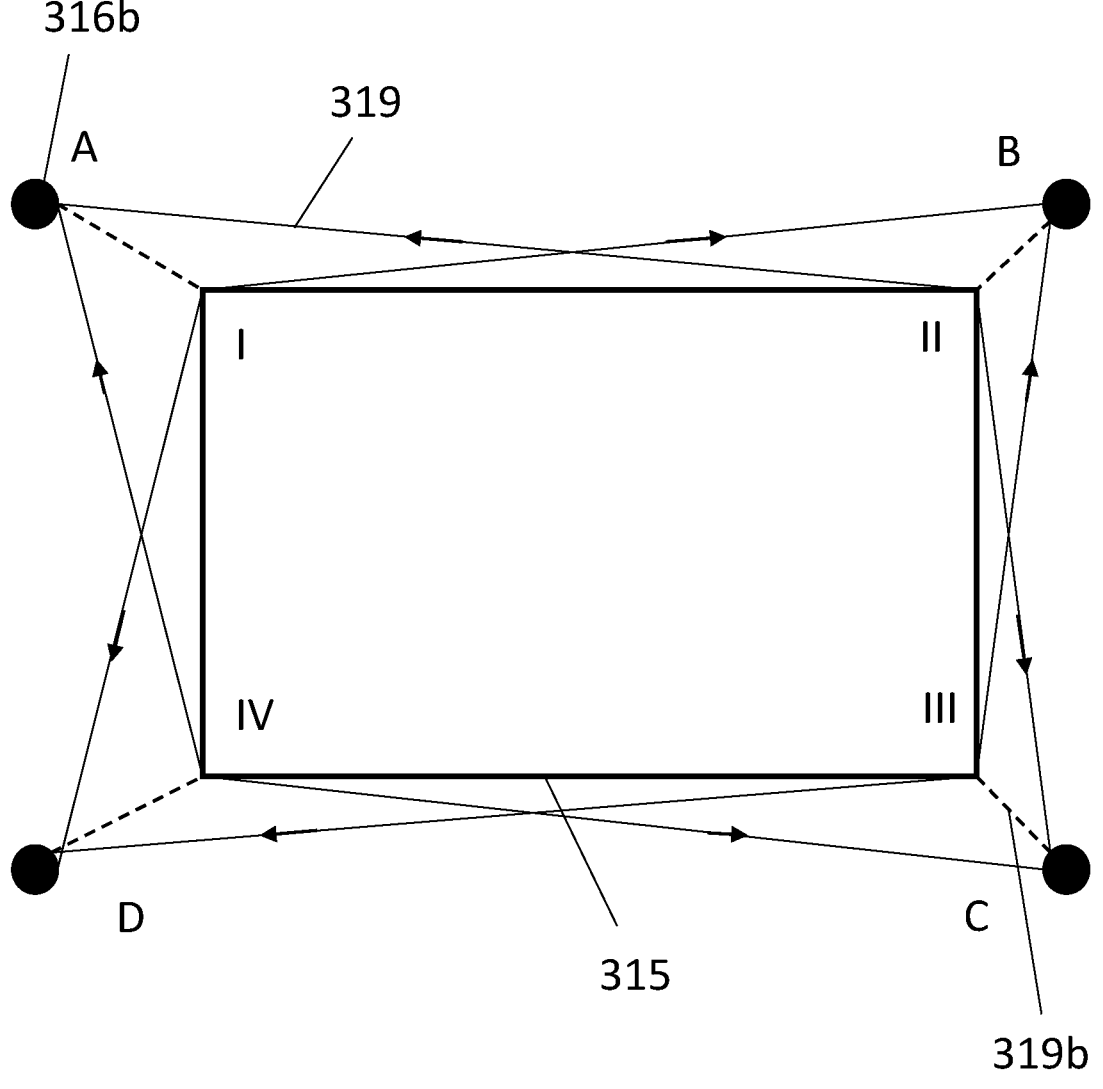

FIG. 19 is a schematic top plan view of the pattern of tension elements suspending the grid structure according to the third embodiment of the present invention shown in FIG. 18.

FIG. 20*a* is a perspective view of a storage system comprising the grid framework structure according to a fourth embodiment of the present invention.

FIG. 20*b* is a perspective view of a portion of the grid structure showing the path for one or more load handling devices to travel between adjacent modular units.

Figure 21:
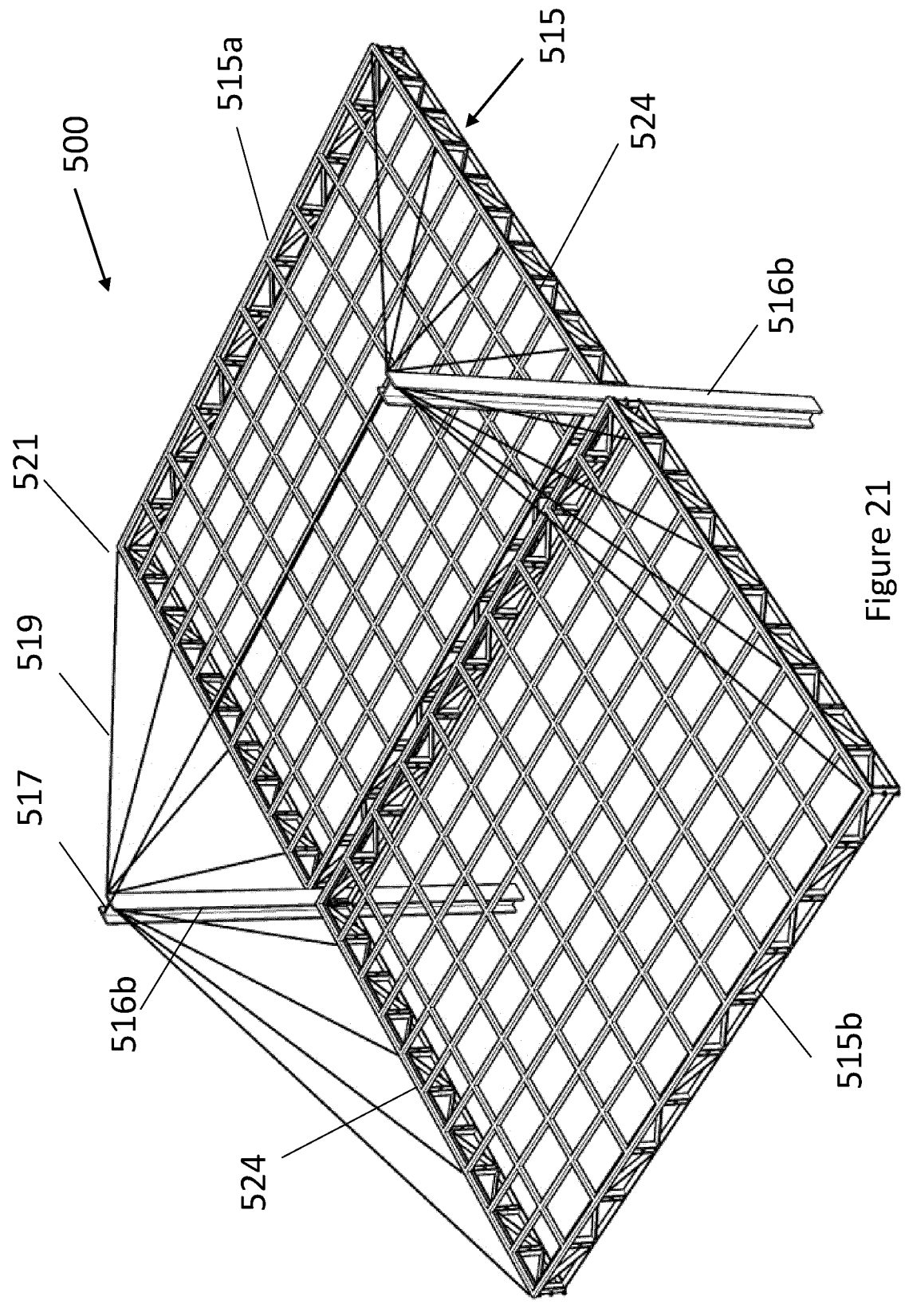

FIG. 21 is a perspective view of a grid framework structure according to a fifth embodiment of the present invention.

Figure 22:
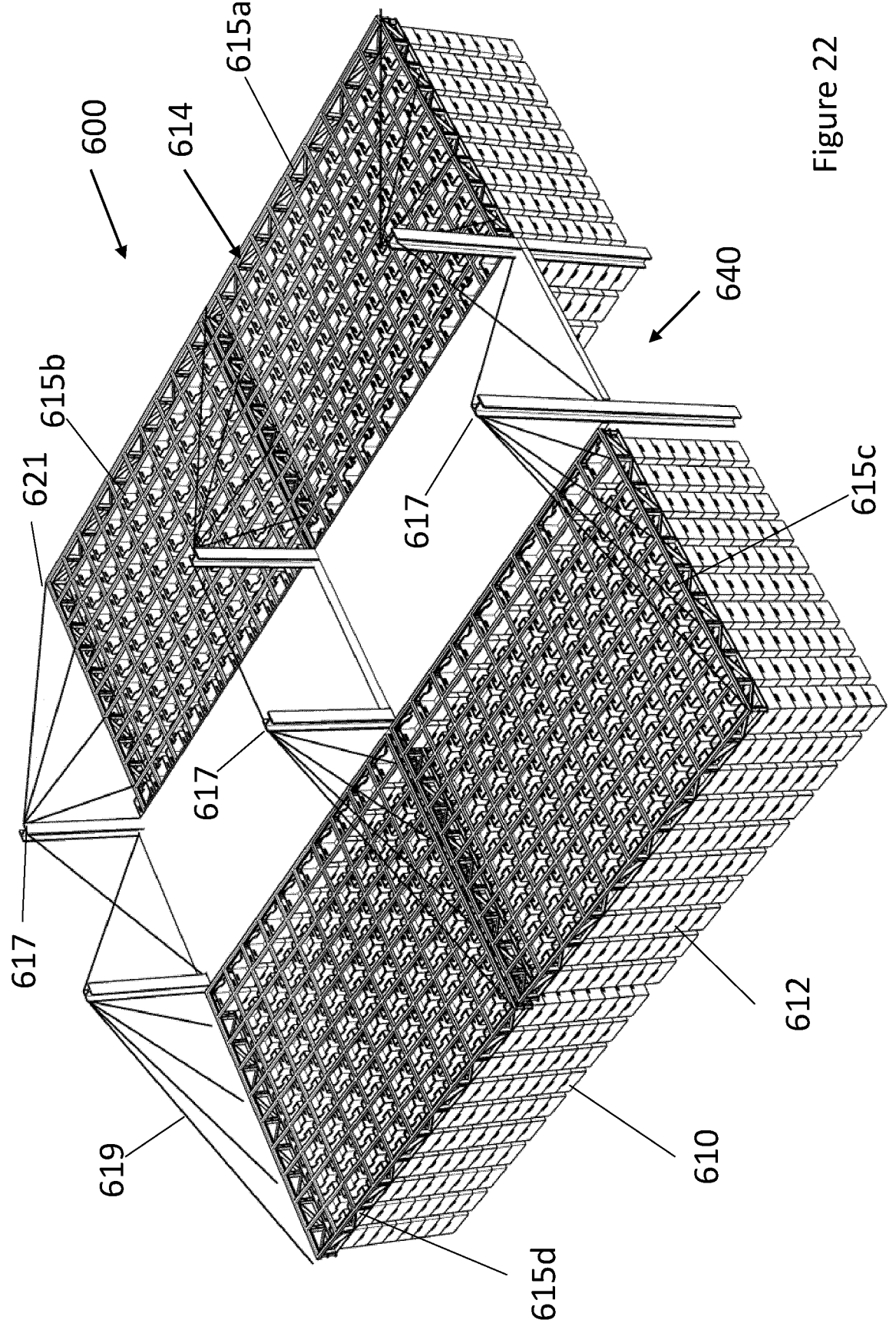

FIG. 22 is a perspective view of a storage system whereby the storage system comprises a mezzanine supported by a grid framework structure either side of the mezzanine according to a sixth embodiment of the present invention.

FIGS. 6 to 8 shows an example of a storage system 100 comprising the grid framework structure 114 according to a first embodiment of the present invention. The grid framework structure 114 comprises a grid structure or grid 115 comprising a plurality of grid cells suspended from a load bearing structure or framework 116. The load bearing framework 116 comprises one or more load bearing mounting points 117 for suspending the grid structure 115 by the one or more tension or suspension elements 119 anchored to a respective number of suspension points 121 on the grid structure 115. Various tension or suspension elements 119 for suspending the grid structure from the load bearing framework known in the art are applicable in the present invention. For example, the at least one tension or suspension element 119 can comprise a tether including but not limited to a cable (e.g. steel cable) or rope. Ideally, the at least one tension or suspension element 119 comprises a non-extendible portion or has a very high yield strength greater than 2 GPa. An example of tethers that have a very high strength is a material comprising ultra-high-molecular-weight polyethylene (UHMWPE). A commercially available material comprising ultra-high-molecular-weight polyethylene (UHMWPE) is Dyneema®. Alternatively, the at least one tension or suspension element 10 can comprise a rigid structure, e.g. pipe or bar or beam. For the purpose of explanation, the tension element 115 can be considered to be an element comprising one or more parts that extends between the load bearing framework and the grid structure.

In the particular embodiment shown in FIG. 6, the grid structure 115 comprises a square or rectilinear assemblage of grid members 118, 120 that are arranged in a grid pattern for guiding the movement of one or more load handling devices in two directions in the horizontal X-Y plane on the grid structure 115. A portion of the grid structure 115 shown in FIG. 7 comprises a series of horizontal intersecting beams or grid members 118, 120 arranged to form a plurality of rectangular frames constituting grid cells 123, more specifically a first set of grid members 118 extending in a first direction and a second set of grid members 120 extending in a second direction, the second set of grid members 120 running transversely to the first set of grid members 118 in a substantially horizontal plane, i.e. the grid structure 115 is represented by Cartesian coordinates in the X and Y plane. For the purpose of explanation of the present invention, the points or junctions where the grid members intersect or cross can be defined as nodes or intersections 124.

Whilst the particular embodiment in FIG. 6 shows the grid structure 115 having a square or rectilinear shape, other shaped grid structures comprising a plurality of grid cells 123 for one or more load handling devices 130 to be guided in two directions on the grid structure are permissible in the present invention. For a square or rectilinear shaped grid structure, to ensure that the grid structure 115 is level the grid structure 115 is suspended from the load bearing framework 115 proximal to or at each of the corners of the grid structure 115, i.e. by at least one tension element 119 anchored proximal to each of the four corners of the grid structure 115. The grid structure 115 is suspended from the load bearing framework structure 116 by multiple tension elements 119 anchored to a respective number of mounting or suspension points 121 on the grid structure 115. The mounting or suspension points 115 are strategically placed on the grid structure 115 so as to ensure that when the grid structure is suspended by the multiple tension elements 119, the grid structure lies in a substantially horizontal plane, i.e. the grid structure is level. The number of mounting or suspension points 121 on the grid structure 115 for suspending the grid structure from is dependent on the shape of the grid structure and the load on the grid structure. Loads on the grid structure include but are not limited to the one or more load handling devices 130 on the grid structure 115 and the weight of one or more containers or storage bins being carried by the one or more load handling devices. For example, a triangular shaped grid structure would require a minimum number of at least three tension elements 119 anchored to the corners or proximal to the corners of the grid structure to ensure that the grid structure is level. Equally, for a square or rectilinear shaped grid structure, a minimum number of at least four tension elements 119 are anchored to or proximal to the four corners of the grid structure. For the purpose of the present invention, the shape of the grid structure represents the shape of the periphery of the grid structure. In the particular embodiment shown in FIG. 6, the load bearing framework 116 comprises at least one vertical upright column 116*b* proximal to each of the corners of the grid structure and arranged in a rectilinear or square configuration.

The grid structure 115 is suspended from the load bearing framework 116 such that the grid structure 115 is suspended within the volume bounded by the load bearing framework 116. Various mounting or suspension points or anchor points 121 known in the art for suspending the grid structure 115 from the load bearing framework 116 by a respective number of tension elements 119 are applicable in the present invention. In one example of the present invention, each of the mounting or suspension points 121 for anchoring a respective number of tension elements 119 comprises a pivotable joint, e.g. a ball joint or the like, so as to enable the grid structure 115 to swing or sway relative to the load bearing framework 116.

One of the main advantages of suspending the grid structure 115 from the load bearing framework 116 by a plurality of tension elements 119, besides removing the need to support the grid structure by a plurality of vertical uprights distributed at each of the nodes, is the ability to compensate for the effects of the movement of the load bearing framework 116 during, for example, a seismic activity or strong winds. Suspending the grid structure 115 from the load bearing framework 116 allows the suspended grid structure 115 to move horizontally relative to the load bearing framework 116 to counteract the movement of the load bearing framework which would oscillate at the same frequency as the ground or floor. The nature of the movement of the grid structure 115 suspended from the load bearing framework 116 can be envisaged to be similar to that of a pendulum of the same mass. If the load bearing framework 116 were to be moved horizontally, the grid structure 115 would not immediately respond to such movement, but initially remain relatively motionless relative to the original position of the of the load bearing framework 116, as would a pendulum. The suspension of the grid structure 115 from the load bearing framework 116 is thus isolated from the movement of the load bearing framework 116 due to the tension or suspension elements 119 suspending the grid structure. By virtue of suspending the grid structure 115 from the load bearing framework 116, the grid structure 115 can act like a Tuned Mass Damper (TMD), also called a "harmonic absorber", so as to reduce the amplitude of vibration of the load bearing framework 116 to an acceptable level whenever a strong lateral force such as earthquake or high winds hits the grid structure 115. The suspended grid structure 115 counteracts and absorbs the kinetic energy generated during oscillation of the load bearing framework 116. For example, the suspended grid structure 115 oscillates to counteract the oscillation of the load bearing framework 116 to generate a level of damping of the grid framework structure 115.

To improve the ability of the suspended grid structure 115 to counteract and absorb the kinetic energy generated during oscillation of the load bearing framework 116 during a seismic event, the load bearing framework 116 further comprises means for damping the movement of the grid structure relative to the load bearing framework. For example, the means for damping the movement of the grid structure 115 comprises one or more dampers 126 disposed between the load bearing framework and the grid structure (see FIG. 8). For example, an elastic element can be disposed between the load bearing framework 116 and the grid structure 115. The elastic element could be a resilient material that is able to absorb impacts of the grid structure 115 against the load bearing framework 116. In the particular embodiment shown in FIG. 8, the resilient material 126 comprises rubber that is mounted to a corner section of the vertical upright column 116*b* at a level or height of the grid structure 115 such that lateral or horizontal movement or swaying of the grid structure 115 is damped by the rubber damper 126. The rubber damper 126 at the corner section of the vertical upright 116*b* functions as a rubber bumper to absorb the impact of the grid structure 115 colliding against the vertical upright column 116*b* or any parts of the load bearing framework 116 during a seismic event. Other elastic elements could be used, or in combination with rubber. These include the use of a spring. Alternatively or in addition to the use of an elastic element, other means to damp the movement of the grid structure 115 are permissible in the present invention. These include but are not limited to a hydraulic damper. Whilst the particular embodiment shown in FIG. 8 show the damper mounted to the load bearing framework 116, in particular to the vertical upright columns 116*b*, the reverse is equally applicable where one or more of the dampers 126 can be mounted to the grid structure 115, in particular to the corners of the grid structure or along any portion of the grid structure that is in close proximity to the load bearing framework 116.

The one or more dampers can be a tuned mass damper where the frequency of the damping can be tuned to provide more effective damping of the movement of the grid structure 115, e.g. by causing the grid structure 115 to oscillate or vibrate at the same frequency of oscillation of the load bearing framework 116 but out of phase with the motion of the load bearing framework 116. For example, the one or more dampers can be an adjustable tuned mass damper commonly known in the art but configured for tuning the damper's natural frequency of vibration or oscillation of the grid structure 115. Examples of reducing the amplitude of oscillation of the load bearing framework 116 is by controlling the frequency of oscillation of the grid structure 115. One way of controlling the frequency of oscillation of the suspended grid structure 115 is to adjust the length of the tension or suspension elements 119 suspending the grid structure 115 from the load bearing framework 116, wherein the shorter the length of the tension elements 119 the smaller the period of oscillation and the higher the frequency. Conversely, the longer the length of the tension elements 119, the larger the period of oscillation and the lower the frequency of oscillation.

In addition to controlling the oscillation of the grid structure 115 in the event of an earthquake or seismic activity, movement of the grid structure will also be induced by one or more load handling devices operative on the grid structure during normal operation of the storage system 100. For the purpose of the present invention, the normal operation of the storage system 100 involves the storage and retrieval of one or more containers or storage bins 110 by one or more load handling devices 130 operative on the grid structure 115 from storage below the grid structure 115. The grid structure 115 would experience forces as result of the reaction forces from one or more load handling devices 130 accelerating on the grid structure 115. Similarly, braking of the one or more load handling devices 130 on the grid structure 115 will additionally generate recoil forces on the grid structure 115. The reactive and recoil forces will cause the grid structure 115 suspended from the load bearing framework 116 to move to counteract the movement of the one or more load handling devices 130 operative on the grid structure 115. Such a movement of the grid structure 115 during normal operation of the storage system 100 would be undesirable as this will impact on the grabber device successfully engaging with a container or storage bin from the storage system 100 which are normally held in a stack 112. Additionally, movement of the grid structure 115 during normal operation will impact on the movement of the one or more load handling devices 130 on the grid structure 115.

To stabilise the grid structure 115 during normal operation of the storage system 100, and thereby to allow the normal operation of the storage system 100 when storing and retrieving containers or storage bins 110 from the storage system 100, one or more stabilisers 128 can be used to stabilise the grid structure 115 suspended from the load bearing framework 116. The one or more stabilisers 128 connected between the load bearing framework 116 and the grid structure 115 prevent the suspended grid structure 115 from movement along a horizontal plane in the X and Y direction or in any direction along the horizontal plane. For example, the one or more stabilisers 128 can be a substantially non-extendible element or cable that is tensioned between the grid structure 115 and the load bearing framework 116 at various locations along the edge of the grid structure to prevent movement in all directions along the horizontal plane. The one or more stabilisers 128 can be based on the same material as at least a portion of the tension element 119. In the particular embodiment shown in FIG. 8 showing a corner section of the grid structure 115, one or more stabilisers 128 in the form of a cable or tether are tensioned between the load bearing framework 116, more specifically the vertical upright columns 116b, and the corners of the grid structure 115 to stabilise the grid structure 115 from movement along the horizontal plane. Whilst the particular embodiment shown in FIG. 8 shows the one or more stabilisers 128 to be a substantially non-extendible cable or tether, other types of stabilisers to prevent movement of the grid structure 115 along the horizontal plane as a result of the reaction forces and recoil forces of the one or more load handling devices 130 operative on the grid structure 115 are permissible in the present invention. These include but are not limited to a beam or rod tensioned between the grid structure 115 and the load bearing framework 116, and more sophisticated stabilisers based on the use of a hydraulic damper or shock absorber connected between the grid structure and the load bearing framework. The one or more stabilisers 128 are fixed between the grid structure and the load bearing framework.

Whilst it is essential to prevent movement of the grid structure 115 during normal operation of the storage system 100, it can also be important to dampen movement of the load bearing framework 116, in particular in areas susceptible to seismic activity as discussed above. To accommodate the damping of the load bearing framework 116 during a seismic event, the one or more stabilisers 128 can be tuned so as to prevent movement of the grid structure 115 relative to the load bearing framework 116 during normal operation of the storage system 100 but allow movement of the grid structure 115 to dampen movement of the load bearing framework 116 in an event of an earthquake. The one or more stabilisers 128 can be actuated to allow movement of the grid structure 115 relative to the load bearing framework 116 in response to the grid structure 115 experiencing forces exceeding a predetermined force. The cables or tethers 128 stabilising the grid structure can be tuned or sized to break or release at a given yield strength when forces exceed a predetermined amount characteristic of a seismic event. For example, the cables or tethers 128 can be configured to break when forces exceed a predetermined tensile stress or yield strength. This could be by the choice of material used for the cables or tethers 128 having a particular tensile stress or controlling the thickness of the cables or tethers 128. Alternatively, one or more sensors (e.g. accelerometers) mounted to the load bearing framework 116 can be configured to send a signal to a control system to actuate (i.e. release) the one or more stabilisers 128 to allow movement of the grid structure 115 in response to a signal from the accelerometer exceeding a predetermined acceleration indicative of a seismic event. The shaking of the load bearing framework 116 during a seismic event would potentially cause one or more load handling devices operative on the grid structure 115 to topple. Such movement of the load bearing framework would be sensed by the one or more accelerometers mounted to the load bearing framework to actuate release of the one or more stabilisers 128 allowing movement of the grid structure to dampen the movement of the load bearing framework. Where the one or more stabilisers 128 is a hydraulic damper, resistance to movement of the piston of the hydraulic damper can be controlled by controlling the flow of fluid through a bore or release valve, the size of which can be controlled. Other means of controlling the resistance to movement of the grid structure 115 below a predetermined force but allowing movement when the force exceeds a predetermined force known in the art are permissible in the present invention.

The corners of the grid structure as shown in FIG. 8 can optionally comprise a cut out portion 131 to the size of at least one grid cell to accommodate the vertical upright column 116b. Other means to accommodate the vertical upright columns 116b at the corners of the grid structure 115 include but are not limited to threading or inserting the vertical upright column 116b through a grid cell proximal to or at the corners of the grid structure as shown in FIG. 17.

Below the grid structure 115 are multiple stacks 112 of containers 110 arranged in a grid pattern corresponding to the grid pattern of the grid structure 115 above such that one or more load handling devices 130 operative on the grid structure 115 are able to lower a container or storage bin 110 to a correct position in a stack 112. The absence of the vertical uprights at the nodes at the junction where the grid members intersect in the grid structure permits multiple stacks of containers to be stored close together, and therefore able to occupy space that was once occupied by the vertical uprights. The present applicant has learnt that the set of lifting tethers or tapes 38 at the four corners of the grabber device 39 (see FIG. 5), provides sufficient lateral stability of the grabber device 39 and the container attached thereto to lift the container through a grid cell without colliding or disrupting neighbouring containers being lifted from adjacent stacks of containers. As shown in FIG. 6, the stacks of containers or storage bins 110 are sufficiently spaced apart to prevent storage bins or containers in neighbouring stacks colliding with each other as they lifted or lowered through a respective grid cell. To ensure that neighbouring stacks of containers 110 are sufficiently spaced apart in the storage space, one or more stacks 112 of containers are placed on floor rails 132 arranged in a grid pattern comprising one or more grid cells (see FIG. 6). The arrangement of the floor rails 132 ensure that the grid pattern comprising the one or more grid cells of the floor rails 132 aligns with the one or more grid cells 123 of the grid structure 115 above. This is to enable the stacks of containers 112 to be arranged on the floor rails 132 in the same grid pattern as the grid structure 115. Thus, the floor rails 132 allow one or more load handling devices 130 operative on the grid structure 115 to be able to lower containers or storage bins into their correct position in the storage space below.

The load bearing framework 116 is configured for bearing a vertically downward load which includes the weight of the grid structure 115 suspended therefrom and one or more load handling devices 130 (otherwise known as bots) operative on the grid structure 115. In one particular embodiment of the present invention shown in FIG. 6, the load bearing framework 116 comprises four vertical support columns 116b for suspending the grid structure 115 by at least one suspension or tension element 119 proximal to or at each of the corners of the grid structure 115. At least one bracing member 134 extends between each of the vertical upright columns 116b to structurally support the load bearing framework 116 for suspending the grid structure 115 therefrom. The plurality of vertical upright columns 116b together with at least one bracing member 134 extending between each of the vertical upright columns 116b form an exoskeleton around the periphery of the grid structure. The load bearing framework 116, in particular the vertical upright columns 116b, are arranged around the periphery of the grid structure so that the grid structure is suspended within the volume bounded by the load bearing framework. More specifically, the load bearing framework 116 suspends the grid structure 115 beneath the bracing members 134 extending between each of the vertical upright columns 116b.

Suspending the grid structure from at least one mounting or suspension point 121 proximal to or at each of the corners of the grid structure ensures that the grid structure can be made level so that it substantially lies in a horizontal plane. To distribute the load across the load bearing framework 116 and to prevent the load being concentred at the corners of the grid structure 115, additional mounting or suspension points 121 can be provided on the grid structure 115 for suspending the grid structure 115 therefrom. For example, one or more bracing members 134 or cross members 134b can extend at different locations across the grid structure 115 to provide additional load bearing mounting points 117 for the grid structure 115 to be suspended therefrom. In the particular embodiment shown in FIG. 6, the bracing members 134, 134b extend along two perpendicular directions corresponding to the orientation or direction of the grid members 118, 120 of the grid structure 115, i.e. a first set bracing members

134 extending in the first direction and a second set of bracing members 134b extending in the second direction. A set of bracing members 134, 134b (either the first set or the second set of bracing members) are spaced apart along the length of the grid structure 115 in the second direction or the first direction by one or more grid cells. For example, in the particular embodiment shown in FIG. 6, a first set of bracing members 134 extending in the first direction are equally spaced apart along the length of the grid structure 115 in the second direction, and a second set of bracing members 134b extending in the second direction are equally spaced apart along the length of the grid structure 115 in the first direction. The multiple cross bracing members 134b that are spaced apart along the length of the grid structure provide multiple load bearing mounting points 117 for the grid structure to be mounted therefrom by a respective number of tension elements 119 anchored to the grid structure 115. The tension elements 119 are anchored to a respective number of mounting or suspension points 121 on the grid structure 115. In FIG. 9, the grid structure 115 is suspended from multiple tension elements 119 anchored at various locations on the grid structure 115 to distribute the load amongst the multiple tension elements 119.

The tension elements 119 are anchored to the grid structure 115 such that one or more load handling devices are able to move past the tension elements 119 without them being an obstruction. One or more load handling devices are guided by tracks 122 comprising grooves 136 on the grid structure 115. Further detail of the tracks for guiding the load handling devices is discussed below. FIG. 10 show the tracks 122 configured as a double or dual track whereby grooves 136 of the tracks 122 are arranged side by side to allow the load handling devices to pass each other along the track. The grooves 136 either side of the track are sufficiently spaced apart to allow the load handling devices to pass each other. The spacing or island 138 between the grooves provides a convenient location for anchoring the at least one tension element 119 therefrom without it being an obstruction to a travelling load handling device on the grid structure 115.

In the particular embodiment shown in FIG. 6 and FIG. 11, the at least one bracing member 134, 134b extending between each of the vertical upright columns 116b and/or across the grid structure can be a truss. The trusses connecting the vertical upright columns and/or across the grid structure provides a lightweight rigid structure comprising a triangulated system of straight interconnected structural elements that are in axial tension or compression. For the purpose of the present invention, a "truss" is a rigid structure consisting of an upper chord and a lower chord joined together by one or more diagonal and/or straight members. Various structural joints or connectors can be used to rigidly fix the at least one bracing member 134, 134b to the vertical upright columns 116b and/or connecting adjacent bracing members 134, 134b. These include but are not limited to welding, bolts and/or rivets. The structural joints or connectors can also include one or more slip joints for providing relative movement or "slip" between any of the connections of the bracing members and/or vertical upright columns.

It is essential that the grid structure 115 when suspended from the load bearing framework is level, as an uneven grid structure will have an impact on the proper engagement of the grabber device with one or more storage bins or containers below. As discussed above, the grid structure 115 is mounted from various mounting points 121 on the grid structure 115. In order that the grid structure 115 is level so that it lies in a substantially horizontal plane, the tension elements 119 for suspending the grid structure from the load bearing framework are proximal to or at each of the corners of the grid structure. The length of each of the tension elements 119 suspending the grid structure proximal to or at each of the corners of the grid structure are sized so that the grid structure lies in a substantially horizontal plane. To control the level of the grid structure, the length of at least one of the tension elements proximal to or at each of the corners of the grid structure can be made adjustable. Various mechanisms known in the art for adjusting the length of the at least one tension elements 119 are permissible in the present invention. For example, the at least one tension element 119 comprises or is fixed to an adjustment mechanism 119c for adjusting the length of the at least one tension element 119, and thereby adjusting the separation between load bearing mounting point of the load bearing framework and the grid structure. For the purpose of ease of explanation of the tension or suspension element, in particular the variable length of the tension element, the tension element can comprise one or more parts, each of the one or more parts comprising an inextensible part 119b, an optional adjustable part 119c and an optional motorised part 119d. The inextensible part 119b could be a tether, e.g. comprising ultra-high-molecular-weight polyethylene (UHMWPE) as discussed above. The different parts of the tension element 119 according to an embodiment of the present invention is shown in FIG. 12. The adjustable part 119c and the motorised part 119d are optional and function to adjust the entire length L of the tension element 119. In other words, the term tension element is broadly defined to encompass an inextensible part, an optional adjustable part 119c and an optional motorised part 119d. Another way of describing the tension element is that the tension element 119b is an inextensible element and the load bearing framework can optionally comprise an adjustment mechanism 119c anchored to the tension element 119b. The adjustment mechanism has a variable length that can be extended or retracted to adjust the height of the grid structure. Furthermore, the load bearing framework can optionally comprise a motor to automatically adjust the adjustment mechanism.

In the particular embodiment of the present invention, the adjustment mechanism or part 119c comprises a threaded shaft than can be extended or retracted to adjust the length of the at least one tension element 119 as shown in FIG. 12. Other means to adjust the length of the at least one tension element 119 are applicable in the present invention. These include but are not limited to a hydraulic system using an air or oil compression commonly known in the art. The adjustment mechanism 119c can be motorised so as to enable the level of the grid structure to be automatically adjusted. As shown in FIG. 12, the motor 119d anchored to a load bearing mounting point 117 of the load bearing framework is used to rotate a threaded shaft connected to a portion of the tension element 119b to control the length of the tension element 119 or the separation between load bearing mounting point 117 of the load bearing framework and the grid structure 115. The portion or part of the tension element 119b connected to the adjustment mechanism can be a cable or a rope or a beam. For example, one end of the cable 119b is anchored to the adjustment mechanism 119c and the other end of the cable 119b anchored to the grid structure or another optional adjustment part 119c.

The adjustment mechanism 119c can be remotely operated to control the level of the grid structure. One or more sensors (not shown) such as an inclinometer or tilt sensor mounted to the grid structure can be used to monitor the level of the grid structure. Examples of an inclinometer suitable for measuring the inclination of the grid structure include but are not limited to a ball mechanism, capacitive tilt sensors etc. A control system can operate on a feedback loop where measurements of the level of the grid structure from one or more tilt sensors mounted to the grid structure are input into the control system and used by the control system to control the adjustment mechanism of one or more tension elements in response to the tilt or the angular orientation of the grid structure falling outside a predetermined range, i.e. between +/−0° to 5°, preferably between 0° to 1°, more preferably 0.1°. The control system can be the same control system for controlling the stabilisation of the grid structure within the load bearing framework as discussed above, or a separate control system.

An example of a block diagram showing the main components of the feedback loop utilising a tilt sensor for measuring and adjusting the level or angular orientation of the grid structure is shown in FIG. 13. In the example shown in FIG. 13, one or more tilt sensors 140 monitor the angular orientation of the grid structure, and the measurement signal is fed to the control system 142. If the angular orientation of the grid structure as measured by the one or more tilt sensors 140 mounted to the grid structure falls outside a predetermined tilt angle range, the controller or control system 142 will instruct the one or more tension elements 119 to adjust their length by actuating their respective adjustment level mechanisms 119c until the signal from the one or more tilt sensors falls within a predetermined tilt angle range. The control system 142 can be configured to communicate with the one or more tilt sensors 140 and/or adjustment mechanism 119c across a network so that signals from either the one or more tilt sensors and/or the adjustment mechanism can be sent wirelessly to the control system. The network may comprise a local area network (LAN), a wide area network (WAN) or any other type of network, e.g. Bluetooth or other short range wireless link. The one or more tilt sensors and/or adjustment mechanism can be wired to or wirelessly coupled to the network. Data communication between the control system and the one or more tilt sensors and/or adjustment mechanism can be through a wireless transmitter/receiver means.

However, adjustment of the grid level may affect the ability of the one or more stabilisers 128 to stabilise the grid structure 115 suspended from the load bearing framework 116. To mitigate this problem, the one or more stabilisers 128 can be adjusted to re-stabilise the grid structure 115 in an event that the level of the grid structure is adjusted. For example, in the case where the one or more stabilisers 128 is a cable or tether, the tension of the cable or tether 128 can be adjusted to ensure that they are at the correct tension, i.e. retracted. Equally, in the case where the one or more stabilisers 128 is a hydraulic damper, the hydraulic damper can be adjusted, e.g. by the controlling the release valve and/or hydraulic fluid, so as to ensure that the hydraulic damper offers the correct resistance against movement. In any case, detection of movement of the load bearing framework by one or more accelerometers during a seismic event may cause the one or more stabilisers 128 to release, allowing the oscillation of the grid structure to dampen the movement of the load bearing framework.

Moving on to the grid structure 115 itself, each of the grid members 118, 120 of the present invention can comprise a track support 118b, 120b and/or a track or rail 122a, 122b (see FIG. 14) whereby the track or rail 122a, 122b is mounted to the track support 118b, 120b. A load handling device is operative to move along the track or rail 122a, 122b of the present invention. Alternatively, the track 122a, 122b can be integrated into the track support 118b, 120b as a single body, e.g. by extrusion. In the particular embodiment of the present invention shown in FIG. 14, the grid member comprises a track support 118*b*, 120*b* and/or a track 122*a*, 122*b* whereby the track or rail 122*a*, 122*b* is mounted to the track support 118*b*, 120*b*. The track support 118*b*, 120*b* in transverse cross section can be a solid support of C-shaped or U-shaped or I-shaped cross section, or even double-C or double-U shaped support.

FIG. 14 is an example where the grid members 118, 120 of the grid structure 115 are I-beams comprising opposing beam flanges connected by a web and which are able to resist the load from one or more load handling devices operative on the grid structure. The track or rail 122*a*, 122*b* have engagement portions that enable them to be simply snap fitted onto a beam flange of the T-beam 118*b*, 120*b*. As shown in FIG. 14, the fitting of the track to the track support 118*b*, 120*b* comprises an inverted U-shaped cross-sectional profile that is shaped to cradle or overlap the top or beam flange of the track support 118*b*, 120*b*. One or more lugs extending from each branch of the U shape profile engage with the ends of the track support 118*b*, 120*b* in a snap fit arrangement. Whilst T-beams provide superior support in the vertical direction, in another example of the present invention, the grid members 118, 120 can be largely fabricated from tubular or box section beams. As shown in FIG. 15, tubular beams 118, 120 offer improved rigidity and strength in comparison to the back-to-back C sections and T-beams. The tubular cross-sectional profile of the grid members 118, 120 as shown in FIG. 15 offer resistance to bending moments in multiple directions, and thus bending moments experienced by the grid structure can be transferred to the vertical upright columns which largely absorb the lateral forces. The exterior surface of the tubular beams 118, 120 has indentations or depressions 141 extending along the longitudinal length of opposing walls of the tubular beam to enable a track or rail 122 to be snap fitted or slide fitted onto the tubular beam as shown in FIG. 16, i.e. the track support is integrated and forms part of the grid members 118, 120. In both embodiments of the present invention shown in FIG. 14 and FIG. 15, the term "grid members" is loosely defined as comprising track supports and/or tracks. The tracks can be integrated into the track supports. For example, the profile of the tracks can be shaped into the track supports.

Alternatively, a separate track support element (not shown) can be mounted directly to the grid members to permit the track to be mounted thereon. The track support element offers a key to enable a track or rail to be securely fitted to the grid members 118, 120. Multiple track support elements are distributed on the grid members having a profile that is shaped to receive a track. Thus, in comparison to the grid members of the grid structure discussed above where the track support elements is integrated into the body of the grid members, the track support elements of the grid structure is separate to the grid members and provides a key for fixing the tracks. The track is fitted to the grid member via the track support element by a snap-fit and/or slide fit arrangement. The track support elements can be welded to the grid member. The grid structure of the present invention is not restricted to the track support element being a separate component that is welded to the grid elements of the grid. The track support elements can be integrated into the body of the tubular grid members. For example, the profile of the track support elements can be extruded together with the grid members as a single body or the profile of the grid members can be shaped to include a track support element.

For the purpose of the present invention, the track can either comprise a single track or a double track. The mounting points for suspending the grid structure are arranged on the tracks so as to prevent the mounting point and the at least one tension element suspended therefrom being an obstruction for the one or more load handling devices travelling on the tracks. The track comprises grooves or depressions for accommodating at least one set of wheel of a load handling device. FIG. 10 show the tracks 122 configured as a double track whereby the grooves 136 of the tracks are arranged side by side to allow the load handling devices to pass each other along the track. As discussed above, the grooves 136 either side of the track are sufficiently spaced apart to allow the load handling devices to pass each other. The spacing between the grooves or island provides a convenient location for mounting the at least one tension therefrom without being an obstruction to a travelling load handling device on the grid structure.

In an aspect of the present invention, the grid members 118, 120 are welded together at the intersections instead of being bolted together to provide a more rigid and sturdy joint than can be provided by bolting alone. Thus, lateral forces generated in the grid structure are transferred as bending moments at the joints where the grid members cross at each of the nodes 124. The entire grid structure 115 can be pre-assembled together prior to being suspended. By pre-assembling the grid members 118, 120 together, the health and safety aspects as a result of welding the grid members together on-site would be mitigated as the grid members can be welded remotely in a safer environment, e.g. the use of robotic welding. The pre-assembled grid structure can then be subsequently raised so as to be suspended from the load bearing framework on site. Welding the grid members together on-site or in-situ may fall foul of health and safety legislation due to exposure of welding fumes and being a fire risk. Whilst the grid members 118, 120 are shown to be tubular, other cross-sectional shapes with the required load bearing properties to support one or more load handling devices operative on the grid structure are applicable in the present invention. These include but are not limited to I-shape comprising opposing beam flanges connecting by a web, box shape, L-shape or even a C-shape channel.

In contrast to having the grid members of the grid structure being more substantial (in thickness and weight) in order to collectively bear the weight and lateral forces experienced as a result of one or more load handling devices operative on the grid structure, in yet a further embodiment of the present invention shown in FIG. 17, the grid structure 215 can be supported on or formed from an assembly of trusses 218. The assembly of trusses 218 provides a lightweight rigid structure comprising a triangulated system of straight interconnected structural elements that are in axial tension or compression. The lightweight rigid structure is a perfect candidate to allow the grid structure 215 to be suspended from the load bearing framework 116 and yet offer sufficient structural rigidity to bear the weight of one or more load handling devices operative on the grid structure. The truss assembly can be pre-assembled fully or partially prior to being suspended from the load bearing framework on site. The triangulated system of straight interconnected structural elements that are in axial tension or compression permit different types of materials to be used for the truss elements including but are not limited to steel, aluminium, or even lighter materials such plastic material or composite materials, e.g. carbon fibre reinforced material. Bolts or other suitable attachment means may be used to secure the trusses together in the assembly. The use of composite or polymeric materials for the structural elements of the trusses also permit the use of specialist adhesives to join the structural elements together. The use of lightweight materials or beams making up the truss elements or members permits the grid structure to be easily manually handled on site without, or with minimum use of, heavy lifting machinery.

In detail, the grid structure can be envisaged to be an assembly of laterally spaced trusses 218 connected together by one or more straight members, each of the trusses comprising an upper chord and a lower chord joined by diagonal and/or straight downward members or webs. In the particular embodiment of the storage system 200 shown in FIG. 17, the track 222 is supported on an assembly of Warren trusses comprising diagonal bracing members joining upper and lower chords or members. Whilst the particular embodiment shows an assembly of Warren trusses, the truss assembly can be any type of truss that provides structural rigidity to the grid structure against lateral forces including but are not limited to Warren Truss or a K Truss or a Fink Truss or a Pratt Truss or a Gambrel Truss or a Howe Truss. In the particular embodiment of the present invention, the diagonal bracing members 227 are arranged between the upper 218b and lower 218c chords to form a K brace. The truss assembly may have a triangular or other non-trapezoidal shape. For example, other diagonal configurations are applicable including but not limited to an X brace between the upper and lower chords. In operation of the grid structure, the upper chords 218b are typically in compression and the lower chords 218c are typically in tension in the assembly. In addition to the diagonal bracing members 227 connecting the upper and lower chords, straight downward members or webs are disposed between the upper and lower chords.

The assembly of trusses are laterally joined together in the horizontal plane separated with respect to each other by one or more straight cross members 221a, 221b extending in a first direction. The straight cross members 221a are fixedly connected between the upper chords 218b of neighbouring trusses 218. Optionally, the straight cross members 221b are fixedly connected between the lower chords 218c of neighbouring trusses 218. The straight cross members 221a, 221b connecting the individual truss members 218 together are spaced apart in equal intervals along the longitudinal length of the trusses 218 extending in a second direction. The separation between the individual trusses 218 and the spacing of the straight cross members 221a, 221b connecting the individual trusses 218 together are arranged to create a grid pattern that resembles the grid pattern of the grid structure discussed above, i.e. the first direction is substantially perpendicular to the second direction. In the particular embodiment of the present invention shown in FIG. 17, the upper chords 218b of neighbouring trusses 218 and the straight cross members 221a connecting the upper chords 218b together are arranged to provide an upper grid structure comprising a plurality of grid cells. Similarly, the lower chords 218c of neighbouring trusses 218 and straight cross members or lower straight cross members 221b connecting the lower chords 218c together are arranged to provide a lower grid structure comprising a plurality of grid cells. To keep consistent with the language used in the other embodiments of the present invention, the grid structure in this embodiment of the present invention can be envisaged to comprise an upper grid structure 215b and a lower grid structure 215c. The grid cells of the upper grid structure 215b and the grid cells of the lower grid structure 215c align or are in registration such that a grabber device from a load handling device 30 operative on the upper grid structure 215b can be lowered and/or be raised through the grid cells in the upper grid structure 215b and the lower grid structure 215c, i.e. the grid cells in the upper 215b and lower grid structure 215c vertically overlap such that their respective grid cells align.

The assembly of the upper chords 218b and the straight cross members 221a between neighbouring trusses 218 are arranged in a grid pattern to provide a track support comprising a plurality of grid cells. Mounted to the track supports are tracks 222 arranged in a similar grid pattern having a first set of tracks extending in a first direction and a second set of tracks extending in a second direction, the first direction being substantially perpendicular to the first direction. The track support and the tracks are arranged in a grid pattern to define the grid structure of the present invention. The plurality of tracks 222 comprises engagement features that can be snap fit to corresponding engagement features on the track support of the upper grid structure 215b. Equally applicable in the present invention is that the tracks 222 can be integrated into the upper chords 218b and the straight cross members 221a between neighbouring trusses 218 so as to allow one or more load handling devices 30 to travel on the upper grid structure 215b. For example, the profile of the upper chords 218b and the straight cross members 221a between neighbouring trusses 218 are shaped to provide tracks 222. For the purpose of the present invention, the track can either comprise a single track or a double track.

The track support comprising the assembly of trusses is suspended above the floor by the load bearing framework of the present invention to create an open storage space for the storage of multiple stacks of containers 110. The multiple stacks of containers or storage bins are arranged in a similar grid pattern as the grid structure such that one or more load handling devices operative on the grid structure can correctly retrieve or lower a container or storage bin in its correct position in the storage space below. As discussed above, floor rails 132 having a similar grid pattern to the grid structure suspended above help to correctly position the containers or storage bins on the floor. A similar load bearing framework 116 discussed above comprising a plurality of vertical upright columns 116b braced by at least one bracing member 134 from each of the plurality of vertical upright columns 116b and one or more cross bracing members 134b across the grid structure to provide one or more load bearing mounting points can be used to suspend the grid structure underneath. Also shown in FIG. 17 is that the grid structure is suspended from the load bearing framework such that the vertical upright columns 116b are threaded through a grid cell 223 at the corners of the grid structure 215 rather than against a cut out of the grid structure as shown in FIG. 6. As with the first embodiment of the present invention shown in FIG. 6, the load bearing framework 116 further comprises means for damping the movement of the grid structure relative to the load bearing framework. For example, the means for damping the movement of the grid structure comprises one or more dampers disposed between the load bearing framework and the grid structure to dampen the movement of the grid structure. Equally, as with the first embodiment of the present invention, one or more stabilisers support the grid structure from movement during normal operation of the storage system when retrieving and lowering one or more containers to and from storage by one or more load handling devices operative on the grid structure.

Different arrangements of suspending the grid structure from the load bearing framework so that it lies in a substantially horizontal plane are also permissible in the present invention. In a third embodiment of the storage system 300 comprising a grid framework structure 314 shown in FIG. 18, a different arrangement for suspending the grid structure 315 from the load bearing framework 316 by the tension elements 319 is shown. As with the other embodiments of the present invention shown in FIGS. 6 and 17, the grid structure 315 is suspended from each of the corners or proximal to each of the corners 321 of the grid structure 315 so as to enable the level of the grid structure 315 to be adjusted. The same grid structure 315 formed from an assembly of trusses described with reference to FIG. 17 above can be used in the grid framework structure 314 in the third embodiment of the present invention. However, other types of grid structures for supporting one or more load handling devices are applicable in the present invention. For example, the grid structures can comprise grid members based on load bearing beams as taught in FIGS. 14 to 16 comprising I-beams or tubular beams.

The tension elements 319 suspending the grid structure 315 from the load bearing framework are arranged in a pattern so as to stabilise the grid structure 315 from movement in the lateral direction. In comparison to the tension element described with the other embodiments of the present invention, the tension element 319 is an extensible element that is anchored between the load bearing framework and the grid structure. In the particular embodiment of the present invention shown in FIG. 18, the tension elements 319 are anchored 317 to each of the vertical upright columns 316b and at least two different corners of the grid structure 315. More specifically, at least two tension elements 319 are tensioned between each of the vertical upright columns 316b and at least two diagonally opposing corners of the grid structure 315. This is repeated at all four corners of the grid structure such that each corner of the grid structure is pulled in different or opposite directions (substantially two perpendicular directions) by the least two tension elements 319 anchored to at least two vertical upright columns 316b. In other words, at least two tension elements 319 are anchored to each of the vertical upright columns 316b and to two different corners of the grid structure 315, more specifically diagonally opposed corners of the grid structure 315, such that the tension elements 319 at each of the corners of the grid structure 315 pulls the grid structure in two different or opposite directions (substantially perpendicular directions). The pattern of the tension elements 319 anchored to the vertical upright columns 316b and the grid structure 315 is shown in a top plan view of the grid framework structure in FIG. 19. By pulling each corner of the grid structure in two different directions, the grid structure 315 is stabilised from lateral movement in all directions. The tension elements 319 anchored to the corners of the grid structure 315 are arranged in a pattern such that the tension elements extend around the periphery of the grid structure and thereby do not obstruct the movement of one or more load handing devices operative on the grid structure, i.e. keep the operative surface of the grid structure clear from any obstructions that would prevent the one or more load handling devices travelling on the grid structure. In other words, the grid structure 315 is suspended within the volume bounded by the tension elements 319 around the periphery of the grid structure.

The pattern of the tension elements 319 around the grid structure 315 can be explained in FIG. 19, where the vertical upright columns 316b proximal to or at the corners of the grid structure 315 are labelled as A, B, C, and D and the corners of the grid structure are labelled I, II, III and IV. To stabilise the grid structure whilst suspending the grid structure from the load bearing framework 3116, tension elements 319 are anchored between the vertical upright A to at least one load bearing mounting point and the corners II, IV of the grid structure 315. Likewise, tension elements 319 are anchored between the vertical upright B and the corners I, III of the grid structure 315. This is repeated around the grid structure so that vertical column C supports corners II and IV and vertical column D supports corners I and III. The tension elements tensioned between the vertical columns A, B, C, D and their respective corners of the grid structure provide a pulling force in all directions such that the grid structure is suspended within the volume bounded by the vertical upright columns. The arrows in FIG. 19 show the direction of the pulling force from each of the tension elements stabilising the grid structure within the volume bounded by the load bearing framework. As can be made out in FIG. 19, two tension elements 319 at anchored to each corner of the grid structure 315. Also shown in FIGS. 18 and 19, is an additional optional tension element 319b at each of the vertical upright columns shown as a dashed line such that three tension elements are anchored to each of the vertical upright columns and to three corners of the grid structure to provide increased stability of the grid structure. Putting it another way, three tension elements are anchored to each corner of the grid structure 315.

Also shown in FIG. 18 is a different load bearing framework 316 for suspending the grid structure 315. Each of the vertical upright columns 316b of the load bearing framework comprises four vertical members arranged in a square or rectangular configuration and braced together by one or more diagonal and/or straight members. The vertical upright columns 316b can be connected together by one or more cross members 334 to improve the stability of the load bearing framework 316. Like the vertical upright columns 316b, the one or more cross members 334 may comprise four members arranged in a square or rectangular configuration and braced together by one or more diagonal and/or straight bracing members. Each of the vertical upright columns 316b proximal to the corners of the grid structure 315 can comprise at least one load bearing mounting point for anchoring the two or more tension elements 319 to the vertical upright column 316b.

Whilst the embodiment shown in FIG. 18 shows a different arrangement of the vertical upright columns 316b and the cross members 334, the load bearing framework 316 is not limited to the load framework shown in FIG. 18 and other arrangements of the vertical upright columns and the cross members that provide structural stability to suspend the grid structure from the load bearing framework are applicable in the present invention. For example, the grid structure and the pattern of tension elements can be suspended from the load bearing framework shown in FIG. 6.

In a fourth embodiment of the storage system 400 comprising a grid framework structure, the grid structure 415 is formed as separate modular units 415 (*a* to *d*) that are joined together to form a unitary body to allow one or more load handling devices to operate between the modular units 415 (*a* to *d*) of the grid structure 415. Each of the modular units 415 (*a* to *d*) comprises individual modular grid structures comprising a plurality of grid cells that are assembled and connected together such that a load handling device operative on the grid structure 415 is able to travel from one modular unit to another modular unit. In the fourth embodiment of the present invention shown in FIG. 20a, four modular units 415 (*a* to *d*) are assembled and connected together to form a rectilinear or square grid structure 415. Various ways of suspending the grid structure comprising a plurality of modular units are applicable in the present invention. In one example of the present invention shown in FIG. 20a, the grid structure 415 is suspended from a single post or single vertical upright column 416b in an umbrella type configuration, where the tension elements 419 suspending the grid structure 415 from the single vertical upright column 416b form the ribs of the umbrella, i.e. the grid structure is suspended from a central vertical upright and the tension elements fan out from the central vertical upright column.

The joint connecting adjacent or neighbouring modular units 415 (a to d) together can include but are not limited to welding, bolts and/or rivets. The structural joints or connectors can also include one or more slip joints for providing relative movement or "slip" between adjacent or neighbouring modular units 415 (a to d). The connections 417b between adjacent modular units are along the axial directions of the grid structure 415, namely the connections 417b between neighbouring modular units along the first direction and the second direction, where the first direction and the second direction are substantially perpendicular. One end of a plurality of tension elements are anchored to multiple mounting or suspension points 421 along the connections running axially between adjacent or neighbouring modular units 415 (a to d) and the other end of the plurality of tension elements 419 are anchored to the vertical upright column 416b so as to suspend the grid structure above the ground. To ensure that the grid structure is level, the grid structure is suspended from four axial connections between neighbouring or adjacent modular units 415 (a to d).

The plurality of tension elements 419 extend from an apex 421 (representative of a load bearing mounting point) at the top or upper portion of the single vertical upright column 416b to a respective number of mounting points or suspension points 417 along the junction between adjacent modular units 415(a to d). Each of the tension elements 419 for suspending the grid structure 415 from the single vertical upright column 416b extends at an angle from respective suspension or mounting points 421 between the neighbouring modular units 415 (a to d) on the grid structure to the vertical upright column 416b. The multiple mounting or suspension points 421 on the grid structure 415 are spaced apart along the length of the connections 417b between neighbouring modular units 415 (a to d) so that the tension elements 419 extend at different angles to the vertical upright column 416b. In the case where the tensions elements 419 are cables tensioned between the grid structure 415 and the vertical upright column 416b, the cables 419 extend at an angle between the grid structure 415 and the vertical upright column 416b. However, the tension elements 419 angled between the modular units 415 (a to d) and the single vertical upright column 416b would be an obstruction for one or more load handling devices traveling across the modular units 415 (a to d) from one modular unit to another modular unit. To enable the one or more load handling devices to travel between the modular units 415 (a to d), one or more grid cells between neighbouring or adjacent modular units are provided with an unobstructed path to the extent that the one or more load handling devices travelling between neighbouring modular units will not be obstructed by the tension elements. One way to provide an unobstructed path between neighbouring modular units is that the angle that the tension elements 419 make with the grid structure 415 would allow the one or more load handling devices to travel under the tension elements 419. In another way to provide an unobstructed path between neighbouring modular units 415 (a to d) as demonstrated by the arrow in FIG. 20b is that one or more cells between the neighbouring modular units are free from mounting points or suspension points 421 used for anchoring the tension elements to the vertical uptight column. Thus, the one or more unobstructed paths between neighbouring modular units provide a path for one or more load handling devices to travel across neighbouring modular units allowing multiple modular units 415 (a to d) to be connected together to create a larger grid structure 415 than that can be achieved with a single modular unit comprising a plurality of grid cells.

Figure 20:
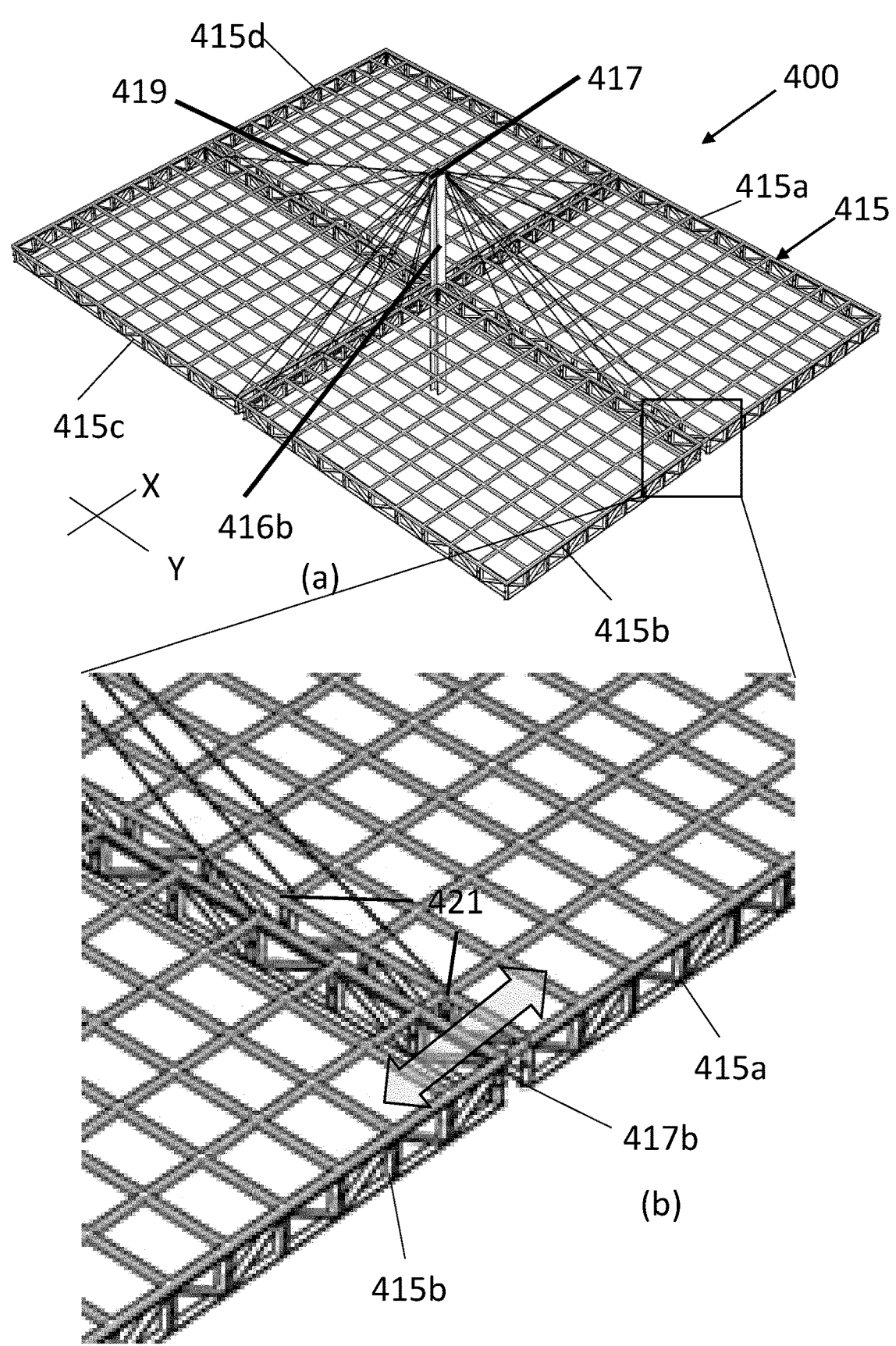

Different arrangements of suspending a grid structure comprising multiple modular units are shown in FIGS. 20 and 21. In a fifth embodiment of the storage system 500 comprising a grid framework structure shown in FIG. 21, two modular units 515a, 515b are assembled and connected together to form the grid structure 515. The grid structure 515 is suspended from either side or opposing edges 524 of the grid structure 515. To ensure that the grid structure 515 is balanced to lie in a substantially horizontal plane, the vertical upright columns 516b are positioned either side of the grid structure 515 at the junction connecting the modular units 515a, 515b together. The plurality of tension elements 519 are anchored to at least one load bearing mounting point 517 on the single vertical upright column 516b either side of the grid structure 515 and a respective number of suspension or mounting points 521 at the edge 524 of the grid structure. The grid structure 515 is suspended from at least one vertical upright column 516b by a plurality of tension elements 519 anchored at opposing edges or sides of the grid structure. The plurality of tension elements 519 extend from an apex 517 at the top or upper portion from the vertical upright column 516b to a respective number of mounting points or suspension points 521 along the edge or side 524 of the grid structure 515 in a V shaped configuration. The at least one load bearing mounting 521 on the vertical upright column 516b defines the apex of the plurality of tension elements.

The grid structure 515 is balanced along one edge 524 of the grid structure 515 by the plurality of tension elements 519 extending from either side of the vertical upright column 516b from an apex. This is repeated on the opposing edge or side 524 of the grid structure 515 so as to balance the grid structure to lie in a substantial horizontal plane. In other words, a plurality of tension elements 519 anchored to the vertical upright columns 516b and to the grid structure 515 are arranged to balance the grid structure in a suspended configuration to lie in a substantially horizontal plane. By suspending the grid structure at opposing edges or sides 524 of the grid structure, the path on the grid structure, i.e. between the suspension points 521, is clear for one or more load handling devices to be able to move unobstructed from one modular unit 515a to another modular unit 515b.

As an extension to the grid structure shown in FIG. 21, multiple modular units can be assembled and connected together to create an even larger grid structure. In the particular embodiment of the storage system 600 comprising a grid framework structure shown in FIG. 22, two rows of grid structures 615a, 615b and 615c, 615d, each row comprising two or more modular units 615a, 615b and 615c, 615d, are connected together and suspended from a plurality of vertical upright columns. The rows of two or more modular units 615a, 615b and 615c, 615d are separated by at least one mezzanine 640. The mezzanine 640 provide a service area in the form of a tunnel within the grid framework structure to accommodate a picking station and/or a service station for servicing the load handling device and/or a charge station for charging the rechargeable power source, e.g. a battery, on board the load handling device. One or more load handling devices are operative on the grid structure 615a, 615b and 615c, 615d either side of the mezzanine 640. A similar pattern arrangement of the tension elements 619 as FIG. 21 can be used for suspending the grid structure 615a, 615b and 615c, 615d from the plurality of vertical upright columns 616b, whereby the grid structures 615a, 615b and 615c, 615d either side of the mezzanine 640 are balanced by the plurality of tension elements 619 either side of the vertical upright columns 616b. Three sets of vertical upright columns 616b are shown in FIG. 22 at different locations along the grid structure. Each set of vertical upright columns comprises two vertical upright columns for suspending a portion of the grid structure either side of the mezzanine. The plurality of tension elements 619 extend from an anchor point or a load bearing mounting point 617 on the vertical upright column 616b and fan out to a respective number of mounting or suspension points 621 on the grid structure 615a, 615b and 615c, 615d, namely at the edge of the grid structure and/or the junction between adjoining modular units.

Multiple stacks 612 of containers or storage bins 610 are shown stored beneath the grid structure 615a, 615b and 615c, 615d for the one or more load handling devices operative on the grid structure to retrieve the containers or storage bins from storage. As with the other embodiments of the present invention discussed with reference to FIGS. 6 to 21, the grid framework structure 614 comprises one or more dampers for damping the movement of the suspended grid structure. The one or more dampers can be mounted to the vertical upright columns or to any portion of the grid structure. The dampers can be a Tuned Mass Damper (TMD), also called a "harmonic absorber" to reduce the amplitude of vibration of the load bearing framework to an acceptable level whenever a strong lateral force such as earthquake or high winds hit the grid structure. Also not shown is that the grid structure can comprise one or more stabilisers to stabilise the grid structure from movement during normal operation of the storage system as discussed above. The one or more stabilisers can be incorporated into the dampers. Other features of the grid framework structure described in the other embodiments of the present invention can be incorporated in the grid structure shown in FIGS. 18 to 22 including but are not limited to the grid level adjustment mechanism. For example, at least one tension element can comprise or be connected to an adjustment mechanism for adjusting the length of the at least one tension element. The adjustment mechanism can comprise a threaded shaft than can be extended or retracted to adjust the length of the at least one tension element. Other means to adjust the length of the at least one tension element are applicable in the present invention. The adjustment mechanism can be motorised so as to allow automatic adjustment of the level of the grid structure.

The grid structure described in all embodiments of the present invention can comprise an assembly of trusses to produce a lightweight rigid structure, or alternatively an assembly of load bearing beams as described in FIGS. 14 to 16. Optionally, the perimeter of the grid structure can be reinforced by trusses connected along the edge of the grid structure so as to provide a reinforced perimeter to anchor the grid structure therefrom. Additionally, the vertical upright columns of the load bearing framework can be any number of load bearing beams that are able to endure the lateral forces from suspending the grid structure from the vertical upright columns. These include but are not limited to I-beams, tubular beams or solid beams. The vertical upright columns can be mounted to various footings having an increased surface area to stabilise the vertical uprights as shown in FIG. 18. These include but are not limited to a flat plate or various topology optimised feet.

Various means or joints for anchoring one end of the tension elements to the load bearing framework and the other end of the tension elements to the grid structure known in the art are applicable in the present invention. These include but are not limited to various cable joints such as bolts, and shackles wherein the tension element is passed through an eye of the shackle.

Where the tension element comprises an adjustment mechanism for adjusting the length of the tension element, the adjustment mechanism at one end of the tension element can be anchored to the load bearing framework and the other end of the tension element is anchored to the grid structure as demonstrated in FIG. 12.

The invention claimed is:

1. A grid framework structure configured to support one or more load handling devices thereupon, said grid framework structure comprising:
   i) a grid structure including a plurality of grid cells; and
   ii) a load bearing framework, wherein the grid structure is suspended from the load bearing framework by three or more tension elements connected to a respective number of suspension points on the grid structure, each of the three or more tension elements having a length configured to suspend the grid structure in a substantially horizontal plane,
   wherein the grid structure is configured to move relative to the load bearing framework, and
   wherein the load bearing framework comprises:
      means for damping movement of the grid structure relative to the load bearing framework,
      wherein the means for damping movement of the grid structure relative to the load bearing framework is disposed between the load bearing framework and the grid structure.

2. The grid framework structure of claim 1, wherein the grid structure is suspended from the corners and/or proximal to the corners and/or along a perimeter of the grid structure.

3. The grid framework structure of claim 1, wherein the grid structure comprises:
   an assembly of modular units, each of the modular units including a plurality of grid cells.

4. The grid framework structure of claim 1, wherein the load bearing framework comprises:
   one or more load bearing mounting points for suspending the grid structure.

5. The grid framework structure of claim 1, wherein the load bearing framework comprises:
   at least one vertical upright column.

6. The grid framework structure of claim 5, wherein the load bearing framework comprises:
   a plurality of trusses supported by the at least one vertical upright column.

7. The grid framework structure of claim 6, wherein the plurality of trusses comprises:
   a first set of trusses extending in a first direction, and a second set of trusses extending in a second direction.

8. The grid framework structure of claim 7, wherein the first set of trusses are arranged in a parallel relationship to each other, and/or the second set of trusses are arranged in a parallel relationship to each other.

9. The grid framework structure of claim 6, wherein the grid structure is suspended from the plurality of trusses.

10. The grid framework structure of claim 6, wherein the at least one vertical upright column comprises:

a plurality of vertical upright columns such that at least one of the plurality of trusses extend from each of the vertical upright columns to form a bracing structure for suspending the grid structure therefrom.

11. The grid framework structure of claim 1, wherein the means for damping movement of the grid structure is disposed between the at least one vertical upright column and the grid structure.

12. The grid framework structure of claim 1, wherein the means for damping movement of the grid structure comprises:

one or more tuned mass dampers.

13. The grid framework structure of claim 1, comprising one or more stabilizers, wherein the grid structure is anchored to the one or more stabilisers for stabilising movement of the grid structure during normal operation of one or more load handling devices on the grid structure.

14. The grid framework structure of claim 13, wherein the one or more stabilisers are anchored between the load bearing framework and the grid structure.

15. The grid framework structure of claim 14, wherein the one or more stabilisers are configured to release when applied forces exceed a predetermined force that is representative of a seismic event so as to permit movement of the grid structure to counteract movement of the load bearing framework.

16. The grid framework structure of claim 1, wherein at least one of the respective number of suspension points on the grid structure comprises:

a pivotable joint.

17. The grid framework structure of claim 1, wherein at least one of the three or more tension elements comprises:

an adjustment mechanism such that length of the at least one tension element is adjustable.

18. The grid framework structure of claim 17, wherein the adjustment mechanism is motorised such that adjustment of the length of a at least one of the three or more tension elements is motorised.

19. The grid framework structure of claim 1, wherein the grid structure comprises:

i) an upper grid structure; and ii) a lower grid structure, each of the upper grid structure and the lower grid structure including a plurality of grid cells, the upper grid structure being vertically spaced from the lower grid structure such that the grid cells in the upper grid structure are in registration with the grid cells in the lower grid structure, wherein the upper grid structure and the lower grid structure are connected together by a plurality of diagonal and straight bracing members to form an assembly truss.

20. The grid framework structure of claim 19, wherein the plurality of diagonal and straight bracing members extend between either opposing first and second sets of grid members in the upper grid structure and lower grid structure.

21. The grid framework structure of claim 20, wherein the plurality of diagonal bracing members are configured and arranged to form a K or X brace between the opposing first set and second set of grid members in the upper grid structure and the lower grid structure.

22. A storage system in combination with the grid framework structure of claim 1, comprising:

i) a plurality of stacks of containers located below the grid structure, wherein each of the stacks of containers occupies a single grid space or grid cell; and ii) one or more load handling devices remotely operated to move the one or more containers stored in the grid framework structure, each of the one or more load handling devices including:

i) a wheel assembly for guiding the load handling device on the grid structure;

ii) a container-receiving space located above the grid structure; and iii) a lifting device arranged to lift a single container from a stack into the container-receiving space.

23. The storage system of claim 22, wherein the lifting device comprises:

a lifting drive assembly and a grabber device configured, in use, to releasably grip a container and lift a container from the stack into the container-receiving space; and a driving mechanism configured and operatively arranged for moving the load handling device on the grid structure.

* * * * *